United States Patent [19]
Mukai et al.

[11] Patent Number: 5,489,965
[45] Date of Patent: Feb. 6, 1996

[54] FINDER DISPLAY APPARATUS

[75] Inventors: Hiromu Mukai, Kawachinagano; Taro Shibuya, Takatsuki, both of Japan

[73] Assignee: Minolta Co., Ltd., Osaka, Japan

[21] Appl. No.: 336,559

[22] Filed: Nov. 9, 1994

Related U.S. Application Data

[63] Continuation of Ser. No. 121,300, Sep. 14, 1993, abandoned.

[30] Foreign Application Priority Data

Sep. 18, 1992 [JP] Japan .................................. 4-249794

[51] Int. Cl.⁶ .................................. G03B 17/20
[52] U.S. Cl. .................................. 354/471
[58] Field of Search .................. 354/471, 219, 354/289.1, 289.12, 476, 478

[56] References Cited

U.S. PATENT DOCUMENTS

| | | | |
|---|---|---|---|
| 4,140,378 | 2/1979 | Suzuki et al. | 354/471 |
| 4,509,848 | 4/1985 | Katsuma et al. | 354/473 |
| 4,750,014 | 6/1988 | Frank | 354/471 |

FOREIGN PATENT DOCUMENTS

| | | |
|---|---|---|
| 57-204028 | 12/1982 | Japan . |
| 58-136025 | 8/1983 | Japan . |
| 60-92234 | 6/1985 | Japan . |
| 62-272236 | 11/1987 | Japan . |

*Primary Examiner*—W. B. Perkey
*Attorney, Agent, or Firm*—Price, Gess & Ubell

[57] ABSTRACT

A finder display apparatus provides a display of information associated with the photographing within a finder field. The finder display apparatus has a reflecting surface, a polarizing plate and an electro-optical display device constituted by a twisted nematic liquid crystal arranged between the reflecting surface and the polarizing plate. The reflecting plate is provided to a Porro prism and has a polarization characteristic different by 90° from the polarization characteristic of the polarizing plate.

40 Claims, 28 Drawing Sheets

FINDER DISPLAY APPARATUS

This is a continuation of application Ser. No. 08/121,300, filed on Sep. 14, 1993, now abandoned.

BACKGROUND OF THE INVENTION

1. Field of the Invention

The present invention relates to a finder display apparatus, and more specifically, to a finder display apparatus for use in a finder optical system of a camera.

2. Description of the Prior Art

Methods and apparatuses have been proposed for displaying various kinds of information necessary for photographing within a finder field of a camera. The information necessary for photographing includes information on a shutter speed and an aperture value associated with exposure, information on a photographic area (field frame) associated with the determination of a photo composition which is an important function of a finder, a focusing area (distance measurement frame) and a photometric area (photometric frame), information on a result of focusing (in/out of focus, front/rear focus) and a direction of focusing, and information associated with flash light. In many cases, these pieces of information vary with photographing occasions. Therefore, it would be convenient for the user looking through the finder in order to perform photographing if, of these pieces of information, only necessary ones are selectively displayed within the finder field according to circumstances. As effective means for realizing this, finder display apparatuses where an electro-optical device such as liquid crystal is used as a display device are known (e.g. the ones disclosed by Japanese Laid-open Utility Model Application No. S60-92234, Japanese Laid-open Patent Applications Nos. S52-110626, S57-204028, S58-85426, S58-13625 and S62-272236).

Conventional finder display apparatuses for use in finder optical systems will hereinafter be described where information as well as a finder image viewed through an eyepiece provided in the finder optical system is displayed within the finder field by means of an electro-optical device constituted by twisted nematic liquid crystal (hereinafter referred to as TN liquid crystal) sandwitched between two polarizing members.

FIG. 2 is a longitudinal cross-sectional view schematically showing a finder optical system for use in a single-lens reflex camera where a finder display apparatus which is a first prior art is employed. This prior art is a finder display apparatus for "within-image-plane display" (explained later) where an electro-optical device requiring two polarizing plates is used as a display device.

An example of the finder display is a so-called superimposed finder display which is displayed in the entire area or an arbitrary area of an image plane within the finder field for viewing a subject image, being superimposed on the subject image (this type of the finder display will hereinafter be referred to as the "within-image-plane display"). Hereinafter, "image plane" will indicate an area of a subject image obtained through a finder optical system unless otherwise indicated. Thus, a finder field (image) viewed by the user through the finder includes an image within the "image plane" and an image outside the "image plane." A type of the finder display where necessary information is displayed outside the image plane within the finder field will be referred to as "outside-image-plane display."

In FIG. 2, 1 is a main mirror, 2 is a focusing screen, 4 is a pentaprism, 5 is an eyepiece system, 6 is a photometric lens system, 7 is a photometric light receiving device, 9 is a sub mirror, 10 is a focusing optical system, 11 is a focusing light receiving device, EP is a pupil, and 301 is an electro-optical display device typically requiring two polarizing plates. The electro-optical display device 301 is a TN liquid crystal device constituted by TN liquid crystal.

At the front and rear of the electro-optical display device 301 along an optical axis AX, polarizing plates 81 and 82 are arranged under a condition where they are attached to base plates 32 and 36 constituting the electro-optical display device 301. The structure and display principle of the TN liquid crystal device will be described later with reference to FIG. 1. The combination of polarization directions of the polarizing plates 81 and 82 is univocally determined depending on the orientation (or rotary polarization) of the TN liquid crystal constituting the electro-optical display device 301. TN liquid crystal has generally been used for such display devices since it is advantageous in cost, space and information amount.

As shown in FIG. 2, light from a subject having passed through a non-illustrated taking lens is partly reflected upward at 90° by a main mirror 1 which is a semitransparent mirror, and reaches a focusing screen 2 to form on the matt 21 a real image approximately equivalent to an image formed on film. In the case where a condenser lens or a Fresnel lens is arranged in front of the matt 21, the image formed on the matt 21 is slightly smaller than the image formed on film. Of the subject light reaching the main mirror 1, the remaining portion of the light which is not reflected but passes through the main mirror 1 is, after having passed through the main mirror 1, directed through the focusing optical system 10 to the focusing light receiving device 11 for automatic focusing. Focusing is performed by use of an output from the focusing light receiving device 11.

In order to turn the real image formed on the matt 21 right way around to obtain an erecting finder image (virtual image), the pentaprism 4 is arranged above the focusing screen 2. In order to enlarge the real image formed on the matt 21 to obtain a virtual image at an appropriate position, the eyepiece system 5 is arranged between the pentaprism 4 and the pupil EP. Between the focusing screen 2 and the pentaprism 4, the electro-optical display device 301, sandwitched between the polarizing plates 81 and 82, is arranged. The polarizing plates 81 and 82 are respectively attached to the base plates 32 and 36 constituting the electro-optical display device 301.

The structure of the TN liquid crystal constituting the electro-optical display device 301 used in the first prior art will briefly be described. FIG. 1 schematically shows a cross section of a typical TN liquid crystal device. In the figure, 31 and 37 are polarizing plates, 32 and 36 are base plates made of glass or plastic, 33a, 33b, 33c and 35 are transparent electrodes, 34 is liquid crystal, 38 is a sealing member. In the figure, leads for supplying power and molecular orientation films on the liquid crystal side surface of the transparent electrodes 33a, 33b, 33c and 35 are not shown.

The combination of polarization directions of the polarizing plates 31 and 37 is determined according to the orientation (or rotary polarization) of liquid crystal molecules in the liquid crystal 34 filled between the base plates 32 and 36. A typical combination is the one where the polarization directions of the two polarizing plates 31 and 37 are perpendicular to each other.

Subsequently, the display principle of the TN liquid crystal device of FIG. 1 will be described. Considering now a liquid crystal display device whose entire surface is transparent (i.e. so-called positive display), when no voltage is applied, if the polarization directions of the two polarizing plates 31 and 37 are perpendicular to each other as mentioned above, the orientation of the liquid crystal molecules in the liquid crystal 34 is twisted by 90°. For this reason, when no voltage is applied, light incident on the liquid crystal device, for example, from the polarizing plate 31 side has only linearly polarized components after passing through the polarizing plate 31. The polarization direction of the light having only linearly polarized components is, although the linearly polarized condition is maintained, rotated by 90° by the influence of the orientation of the liquid crystal molecules. The light whose polarization direction has been rotated is incident on the base plate 36 and passes therethrough. Then, lastly, the light again passes through the polarizing plate 37. Since the polarization direction of the polarizing plate 37 is perpendicular to that of the polarizing plate 31, if the conversion of the polarization direction by the liquid crystal is ideally made, the quantity of the light incident on the polarizing plate 31 and that of the light exiting from the polarizing plate 37 are approximately the same. Thus, the liquid crystal device is transparent, that is, transmits light when no voltage is applied thereto.

Subsequently, an operation of the liquid crystal device when a voltage is applied thereto will be described. Of the transparent electrodes 33a, 33b, 33c and 35 shown in FIG. 1, the transparent electrodes 33a to 33c are arranged in areas covering the shapes of a plurality of kinds of information displayed when the liquid crystal device is used as a display device, while the transparent electrode 35 is arranged to cover nearly an entire surface of the liquid crystal 34.

For example, when a voltage is applied only to the transparent electrode 33a and the transparent electrode 35, only liquid crystal molecules present in a portion sandwiched between the transparent electrodes 33a and 35 are oriented. Specifically, they are oriented so that their lengths are perpendicular to the base plates. Consequently, the polarization direction of light passing through this portion is not rotated. As a result, the light passing through this portion passes through the liquid crystal 34 and the glass plate 36 without its polarization condition being changed.

However, since the polarization direction (polarization plane of transmitted light) of the polarizing plate 37 is perpendicular to the polarization direction of the polarizing plate 31, the light having passed through the portion of the liquid crystal 34 which is sandwiched between the transparent electrodes 33a and 35 does not pass through the polarizing plate 37 after passing through the base plate 36. That is, the area corresponding to the shape formed by the transparent electrode 33a has no light impermeability. Since the portions of the other transparent electrodes (the portions of the transparent electrodes 33b and 33c in FIG. 1) transmit light as described above, only the area corresponding to the shape (i.e. display pattern) formed by the transparent electrode 33a appears dark since it does not transmit light. The function as a display device is thus achieved.

With the feature of the first prior art, the user can simultaneously observe an information display and a subject image on the matt 21 by displaying necessary information on the electro-optical display device 3 by using a display controlling circuit and a driving circuit (not shown).

FIG. 3 is a longitudinal cross-sectional view schematically showing a finder optical system for use in a single-lens reflex camera where a finder display apparatus which is a second prior art is shown. This prior art is a finder display apparatus where an electro-optical device requiring two polarizing plates is used as a display device.

In FIG. 3 the same elements as those of the above-described first prior art of FIG. 2 are denoted by the same reference designations. In FIG. 3, 81a and 82a are polarizing plates respectively attached to base plates 32a and 36a constituting an electro-optical display device 302, 12 is a light source for lighting the electro-optical display device 302 from the rear side thereof, and 13 is a display prism for directing toward the pupil EP a luminous flux coming from the light source 12 and the electro-optical display device 302, which luminous flux is associated with display.

With the feature of the second prior art, by displaying necessary information on the electro-optical display device 302 by using a display controlling circuit and a driving circuit (not shown), the luminous flux transmitted by the electro-optical display device 302 passes through the display prism 13, the pentaprism 4 and the eyepiece system 5, so that the information display can be viewed at the pupil EP. At this time, the information display is located outside the image plane within the finder field and does not interfere in the subject image.

FIG. 4 is a longitudinal cross-sectional view schematically showing a finder optical system for use in a single-lens reflex camera where a finder display apparatus which is a third prior art is employed. This prior art is a finder display apparatus for both the within-image-plane and outside-image-plane displays where an electro-optical device requiring two polarizing plates is used as a display device. In FIG. 4, the same elements as those of the above-described first and second prior arts of FIGS. 2 and 3 are denoted by the same reference designations. The elements the same as those of the second prior art are arranged at different positions.

Of the information displays to be displayed within the finder field, some are of relatively simple shape (e.g. a field frame) and others are of fine shape (e.g. a numeral and a small symbol typically provided by means of segment display). It is not very easy to form displays of different finenesses on one electro-optical device. For example, in the case of an electro-optical device constituted by TN liquid crystal, it is sometimes difficult to form on one device a plurality of kinds of displays requiring different positioning accuracies of two opposing electrodes. In such a case, the cost is lower if displays of fine shape and displays of not fine shape are separately formed on two different electro-optical devices. The third prior art shown in FIG. 4 is an example of a finder display apparatus suitable for such a case.

However, the above-described prior arts present the following problems.

The first problem is that the quality of the finder image deteriorates due to flaws or dirt on the polarizing plate. The polarizing plates readily get flawed and dirty. Since the polarizing plates are arranged in the vicinity of the focusing screen, the flaws or the dirt is readily viewed when the finder field is observed. As a result, the performance of the finder optical system deteriorates because of its poor image quality.

For example, in the case where the electro-optical display device 301 and the polarizing plates 81 and 82 are arranged in the vicinity of an image plane (matt 21) formed by an objective lens system (including a taking lens system associated with a finder optical system for a single-lens reflex camera as well as an objective lens system in a real-image-type finder optical system) like the first and third prior arts, if the polarizing plates 81 and 82 are flawed or dirty, the flaws or the dirt in the vicinity of the focusing screen is clearly viewed since the eyepiece is arranged so that the dioptric power is adjusted with respect to the focusing screen. As a result, the quality of the finder image deteriorates. Regarding the polarizing plates 81a and 82a of the second and third prior arts for the outside-image-plane display, since they are arranged in the vicinity of a position corresponding to the image plane on the optical path, i.e. a position with respect to which the dioptric power is adjusted by the eyepiece, if they are flawed or dirty, the finder image quality similarly deteriorates. Since it is necessary to consider the prevention of the flaws and dirt on the polarizing plates in order to prevent the deterioration of the finder image quality, the assembling must be performed more carefully, which will lead an increase in cost.

The second problem is that the polarizing plate exerts a bad influence on light for photometry. In the case where photometry for determining exposure is performed by using a part or the whole of a finder luminous flux, if a luminous flux having passed through the polarizing plate is used for the photometry, an output value of the photometric light receiving device varies according to the polarization condition of light from a subject. As a result, exposure can be adversely affected. Moreover, since the quantity of light reaching the photometric light receiving device decreases, the low luminance limit performance in photometry deteriorates. For example, in the first and third prior arts of FIGS. 2 and 4, in order to cope with the within-image-plane display, the polarizing plates 81 and 82 are arranged to cover nearly an entire surface of the focusing screen 2. For this reason, if light having passed through the focusing screen 2 is used for photometry, a photometric value can be affected according to the polarization condition of the light from a subject. As a result, it is difficult to automatically obtain an appropriate exposure.

The third problem is that the dioptric power of the display and that of the subject image differ. Since polarizing plates are, typically, 0.3 mm thick, it cannot be helped that the electro-optical display device is away from the focusing screen at least by the amount of the thickness of the polarizing plate. For this reason, for example, in the case of a finder optical system like the first prior art where a subject image and a finder display are simultaneously viewed, the dioptric power of the subject image and that of the finder display differ. Since the larger the difference is, the poorer the finder image quality is, it is preferable to arrange the display optical device to be as close to the focusing screen as possible.

The fourth problem is that it is necessary to use large polarizing plates. In the case where information is displayed within the image plane in the finder field by using an electro-optical device, it is essential that the displayed information should easily be viewed. For this reason, in order to obtain an appropriate finder dioptric power, the electro-optical device is arranged in the vicinity of an image plane formed by the objective lens provided in the finder optical system. Therefore, it has been required that the polarizing plates attached to the base plates of the electro-optical device should be approximately as large as the image formed plane. The use of such large polarizing plates increases the cost.

The fifth problem is that a space produced due to the disposition of the electro-optical display device increases the size of the apparatus. Specifically, the disposition of the electro-optical display device is limited by the thickness of the polarizing plates. Moreover, the fact that the electro-optical display device to which the polarizing plates are attached must be held by some means further limits the disposition of the electro-optical display device, since the polarizing plates must not be directly touched and must not be pressurized.

SUMMARY OF THE INVENTION

An object of the present invention is to provide a compact, low-cost finder display apparatus which causes no deterioration of finder image quality, exerts no bad influence on light for photometry and provides high-quality information display by improving a conventional finder display apparatus where an electro-optical device requiring two polarizing plates is used as a display device.

To achieve the above-mentioned object, according to the present invention, a finder display apparatus for providing a display within a finder field, and provided in a real-image-type finder optical system for obtaining an erecting image by use of a Porro prism, said finder display apparatus, is provided with a reflecting surface provided to the Porro prism, said reflecting surface having a polarization characteristic, a polarizing plate having a polarization characteristic different by 90° from the polarization characteristic of said reflecting surface, and an electro-optical display device constituted by a twisted nematic liquid crystal arranged between said reflecting surface and said polarizing plate.

According to such a feature, the polarizing plate, which is arranged to be separate from the liquid crystal, is located at a position with respect to which the dioptric power is not adjusted. Moreover, by arranging the polarizing plate at an appropriate position, a luminous flux not having passed through the polarizing plate is used for photometry.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments of the present invention will hereinafter be described with reference to the drawings. In each embodiment, the same elements as those of the above-described prior arts of FIGS. 1 to 4 are denoted by the same reference designations and detailed description thereof will be omitted.

Figure 5:
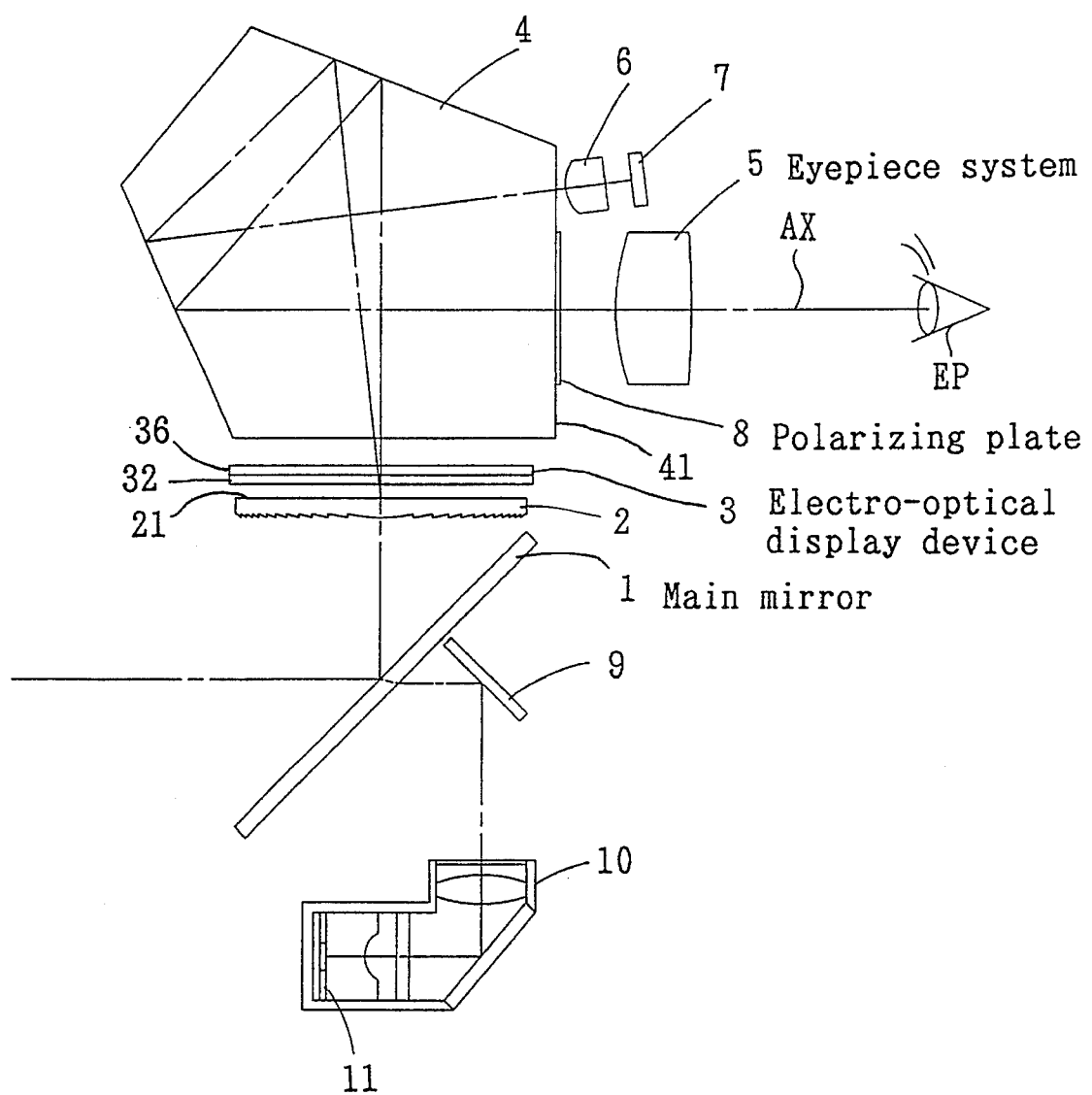
FIG. 5 is a cross-sectional view schematically showing a finder optical system where a first embodiment of the present invention is employed.

FIG. 5 is a longitudinal cross-sectional view schematically showing a finder optical system for use in a single-lens reflex camera where a finder display apparatus which is a first embodiment of the present invention is employed. This embodiment has the same structure as that of the first prior art shown in FIG. 1 except that a polarizing plate 8 is provided to an exit surface 41 of the pentaprism or pentagonal roof prism 4 instead of providing the polarizing plates 81 and 82 to the base plates 32 and 36 (no polarizing plates are provided to the electro-optical display device 3) and that the polarization direction of the main mirror 1 and the orientation direction of liquid crystal molecules of the liquid crystal 34 constituting the electro-optical display device 3 are combined. In this embodiment, the polarizing plate 8 is used as a polarizing member having a polarization characteristic. The polarizing plate 8 is made of the same material as that of the polarizing plates 81, 82, 81a and 82a used in the above-described first to third prior arts.

The electro-optical display device 3 is constituted by a TN liquid crystal device to which no polarizing plates are attached, and is arranged between the main mirror 1 having a dielectric multilayer film as a reflecting plane and the polarizing plate 8 so as to be separate therefrom. The electro-optical display device 3 is arranged to cover the entire image plane within the finder field so that necessary information is displayed in the finder field being superimposed on a subject image. That is, as previously described, a part of light from a subject reaches the focusing screen 2 through the main mirror 1 to form a real image, whereas the TN liquid crystal device 3 is arranged in the upper vicinity of the focusing screen 2 so that predetermined display patterns are selectively displayed to display necessary information by a liquid crystal driving circuit and a display controlling circuit (not shown). Thus, a subject image and a display superimposed on the subject image are simultaneously viewed in the finder.

Figure 6:
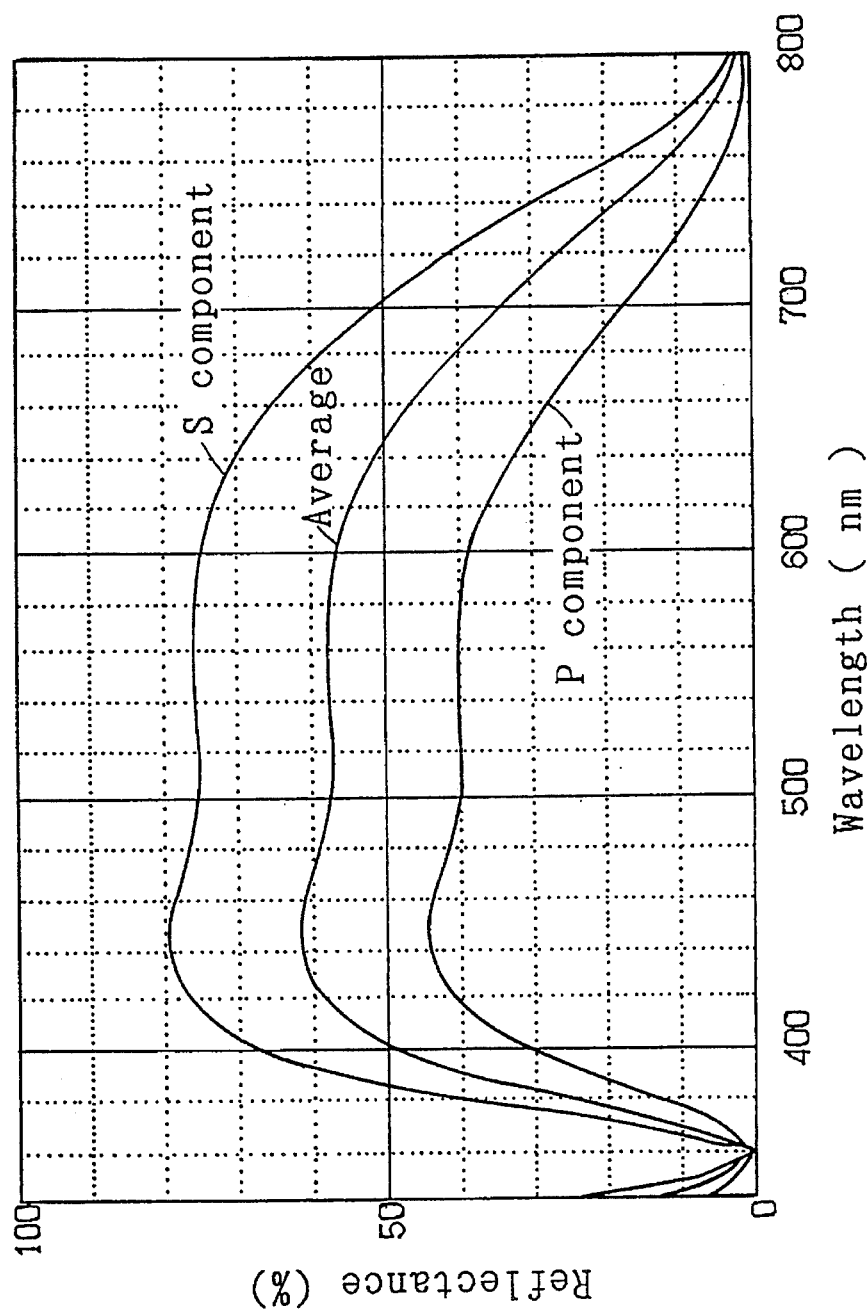
FIG. 6 is a graph showing a spectral reflectance characteristic of a dielectric multilayer film constituting a semi-transparent mirror used in the first embodiment at an angle of incidence of 45°.

The main mirror 1 shown in FIG. 5 is a semitransparent mirror, which is produced by a known method in which a dielectric multilayer film (consisting of five layers) of a structure shown in Table 1 is deposited on a surface of a base plate made of glass and the like. A semitransparent mirror is used as the main mirror 1 in order to divide light from a subject into light for finder field observation through the finder optical system and light for automatic focusing. Moreover, the semitransparent mirror is constituted by a dielectric multilayer film in order to use a polarization characteristic of the dielectric multilayer film. For this reason, any material may be used for producing the semitransparent mirror as far as it has the polarization characteristic. FIG. 6 shows a spectral reflectance characteristic of the main mirror 1 at an incident angle of 45°. The polarization characteristic is shown as a relationship between the wavelength and reflectance shown with respect to an S component, a P component and the average thereof.

Subsequently, a mechanism will be described by which a finder display apparatus according to the present invention is realized with the feature of this embodiment. As mentioned above, the main mirror 1 is a semitransparent mirror produced by deposition of the dielectric multilayer film. It is known (for example, through Japanese Laid-open Utility Model Application S60-92234) that a light beam incident on the main mirror 1 at an incident angle of 45° is provided with an S wave and a P wave as polarization components after having being reflected by the main mirror 1. Using this polarization characteristic, the main mirror 1 is used as one of the two polarizing members and the polarizing plate farther from the eye is omitted. That is, by determining the orientation direction of the liquid crystal molecules according to the polarization direction of a polarization component (S component in this embodiment) having a larger light quantity, the same result is obtained as that obtained by providing the polarizing plate farther from the eye.

On the other hand, regarding the polarizing plate 8 of the electro-optical display device 3 which is closer to the eye, it is impossible to omit it since the omission is inappropriate for its purpose as a display device as is understood from the above-described display principle of the TN liquid crystal. However, the polarizing plate 8 may be arranged on the exit surface 41 of the pentaprism 4 to be separate from the TN liquid crystal as shown in FIG. 5 instead of directly attaching it to the base plate 32 of the TN liquid crystal. That is, in principle, the function as a display device is achieved as far as the polarizing plate is arranged at a position where a luminous flux for finder observation passes therethrough before reaching the eye.

Figure 7:
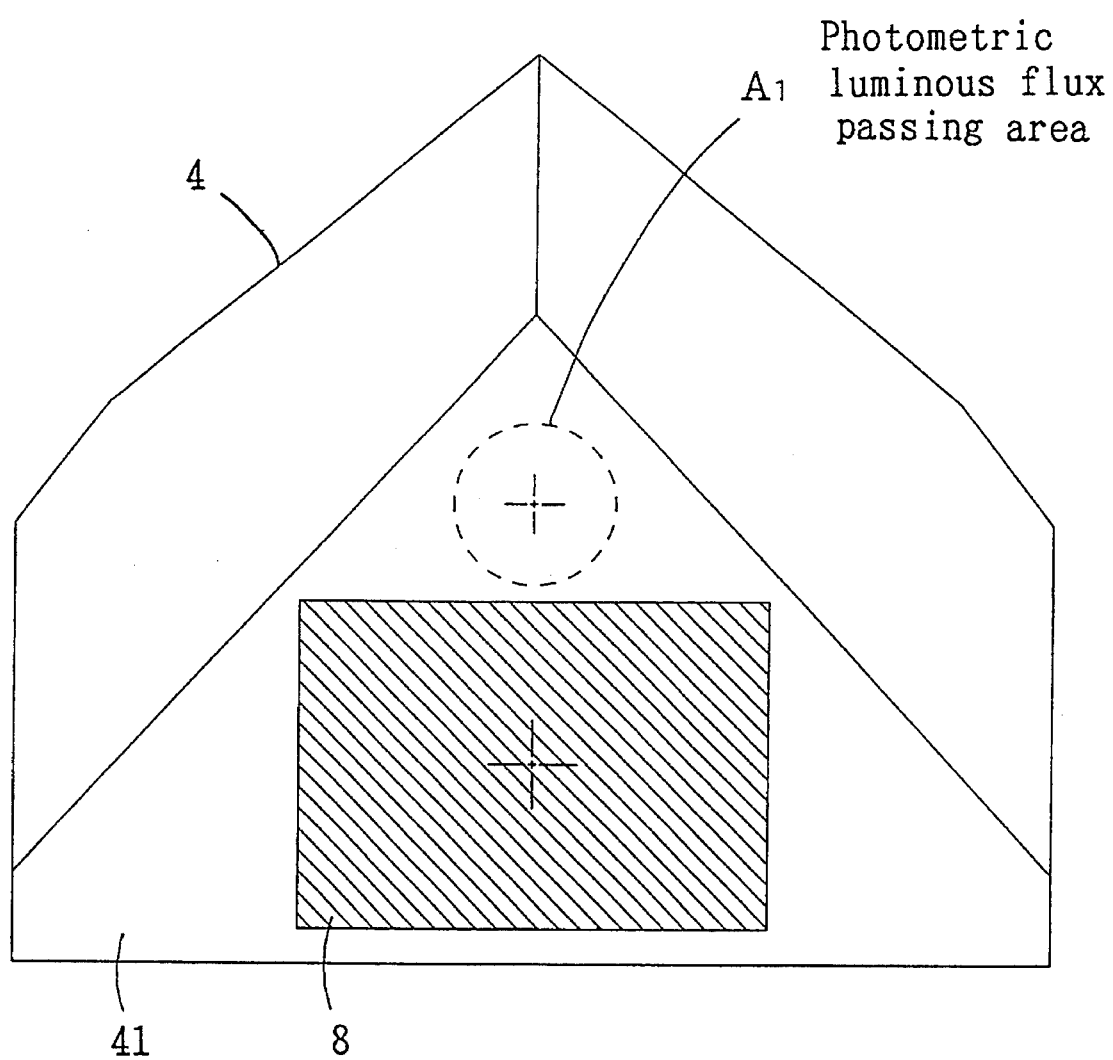
FIG. 7 shows a condition where a polarizing plate constituting the first embodiment of the present invention is attached to a pentaprism.
Figure 8:
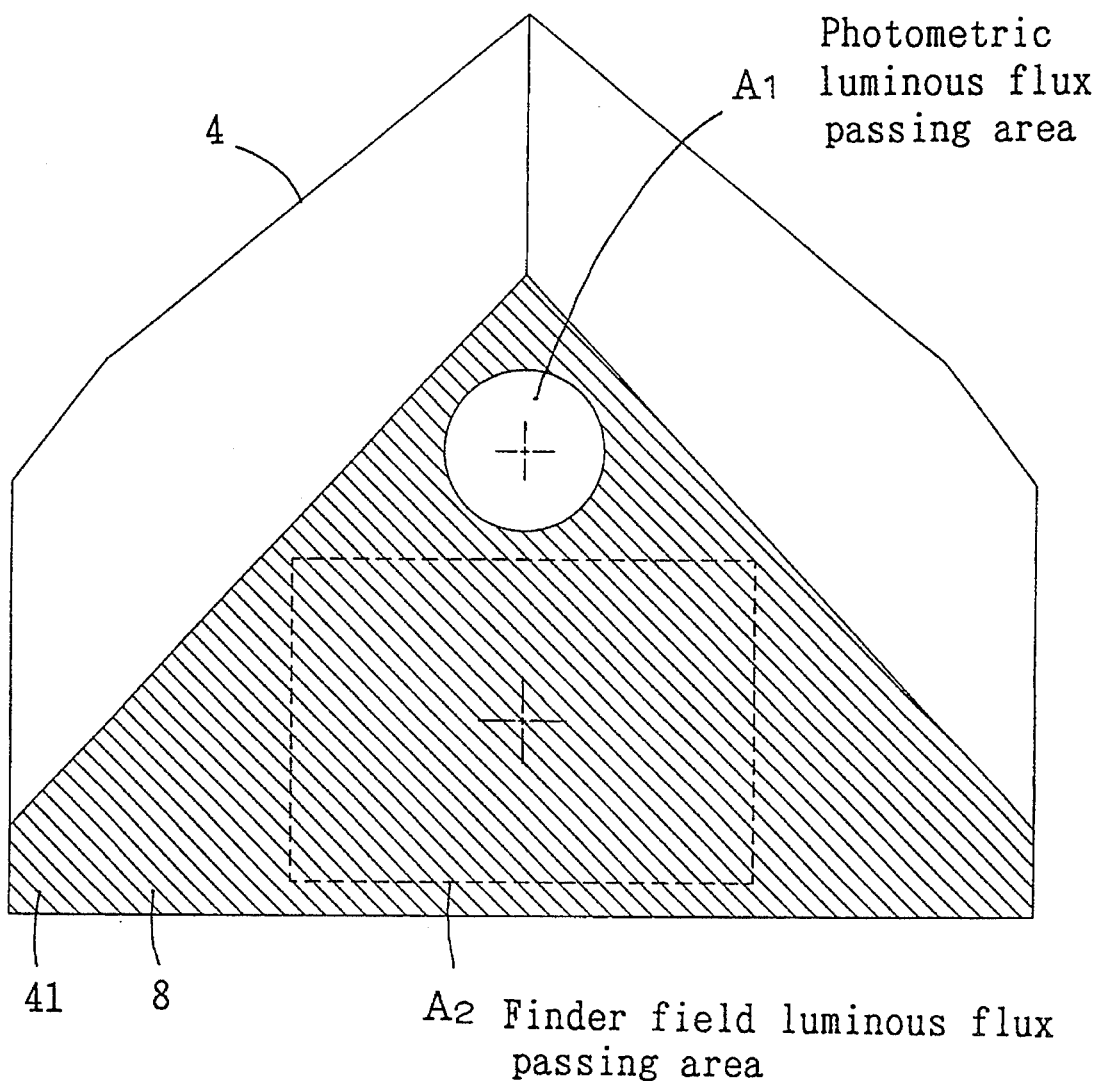
FIG. 8 shows a condition where another polarizing a plate employable for the first embodiment of the present invention is attached to the pentaprism.

Further, in this embodiment, as shown in FIGS. 5 and 7, the polarizing plate 8 is arranged to cover only an area where a finder field luminous flux passes. The arrangement where light not having passed through the polarizing plate is directed through the photometric lens system 6 to the photometric light receiving device 7 for photometry is realized only by arranging the polarizing plate 8 to be separate from the TN liquid crystal. With this arrangement, since the light for photometry passes through a photometric luminous flux passing area $A_1$ (FIG. 7) as is apparent from FIGS. 5 and 7, no influence is exerted on the light for photometry by the polarizing plate 8. As shown in FIG. 8, the polarizing plate 8 may be arranged to cover the exit surface 41 of the pentaprism 4 except for the portion of the exit surface 4 where the luminous flux for photometry passes (i.e. the photometric luminous flux passing area $A_1$). In FIG. 8, an area $A_2$ enclosed by a broken line represents a finder field luminous flux passing area.

As described above, this embodiment is characterized in that in a finder display apparatus for displaying necessary information within a finder field of a camera by using an electro-optical device normally requiring two polarizing plates, of the two polarizing plates, a polarizing plate closer to the eye (closer to the pupil EP) is arranged on the optical path and in the vicinity of the eyepiece system 5 provided in the finder optical system, and that no polarizing plate is directly attached to the electro-optical display device 3 since the semitransparent mirror (main mirror 1) having the polarization characteristic is used as the other polarizing plate.

Figure 1:
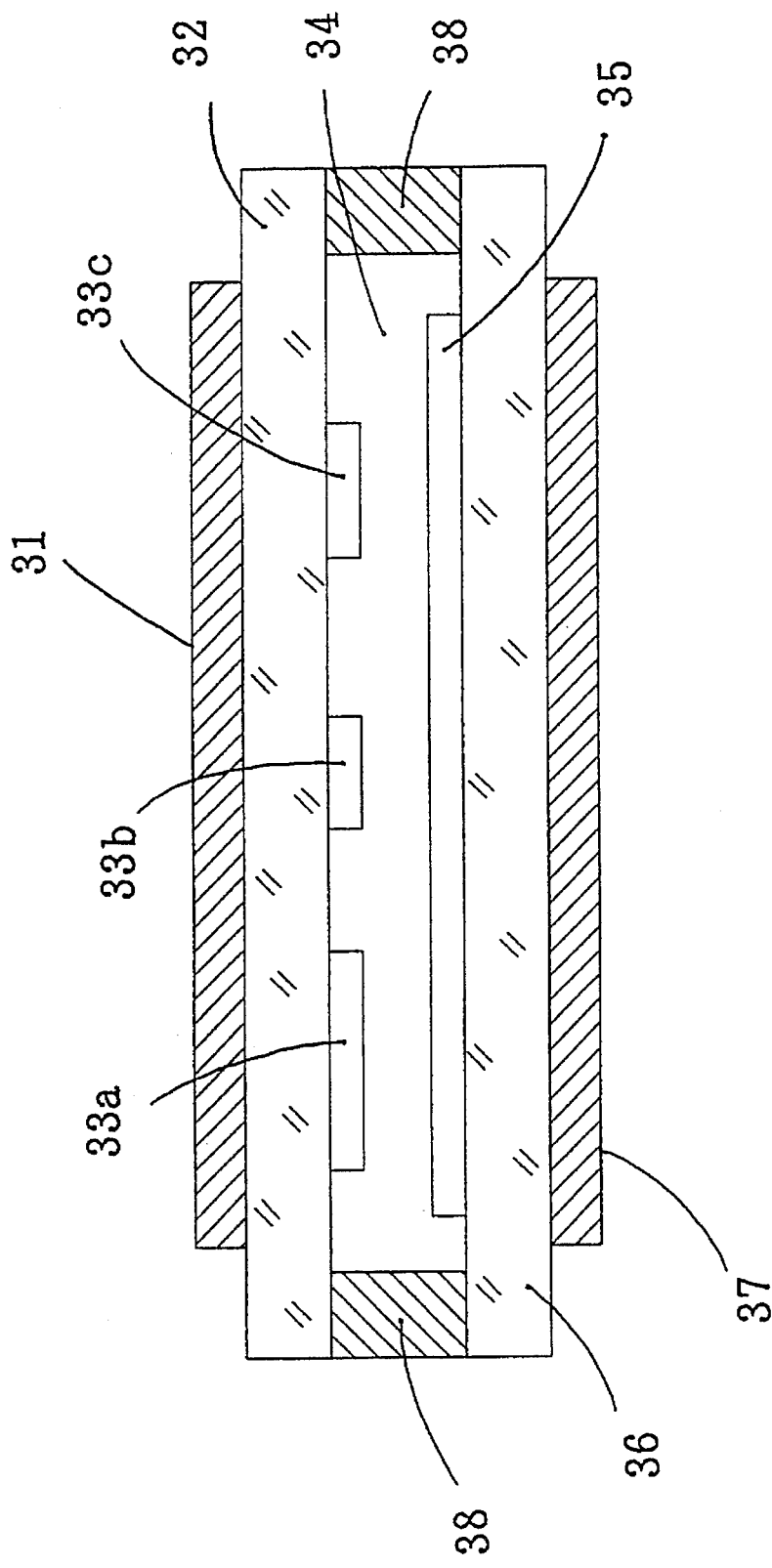
FIG. 1 is a cross-sectional view showing a typical TN liquid crystal device used in prior arts.
Figure 2:
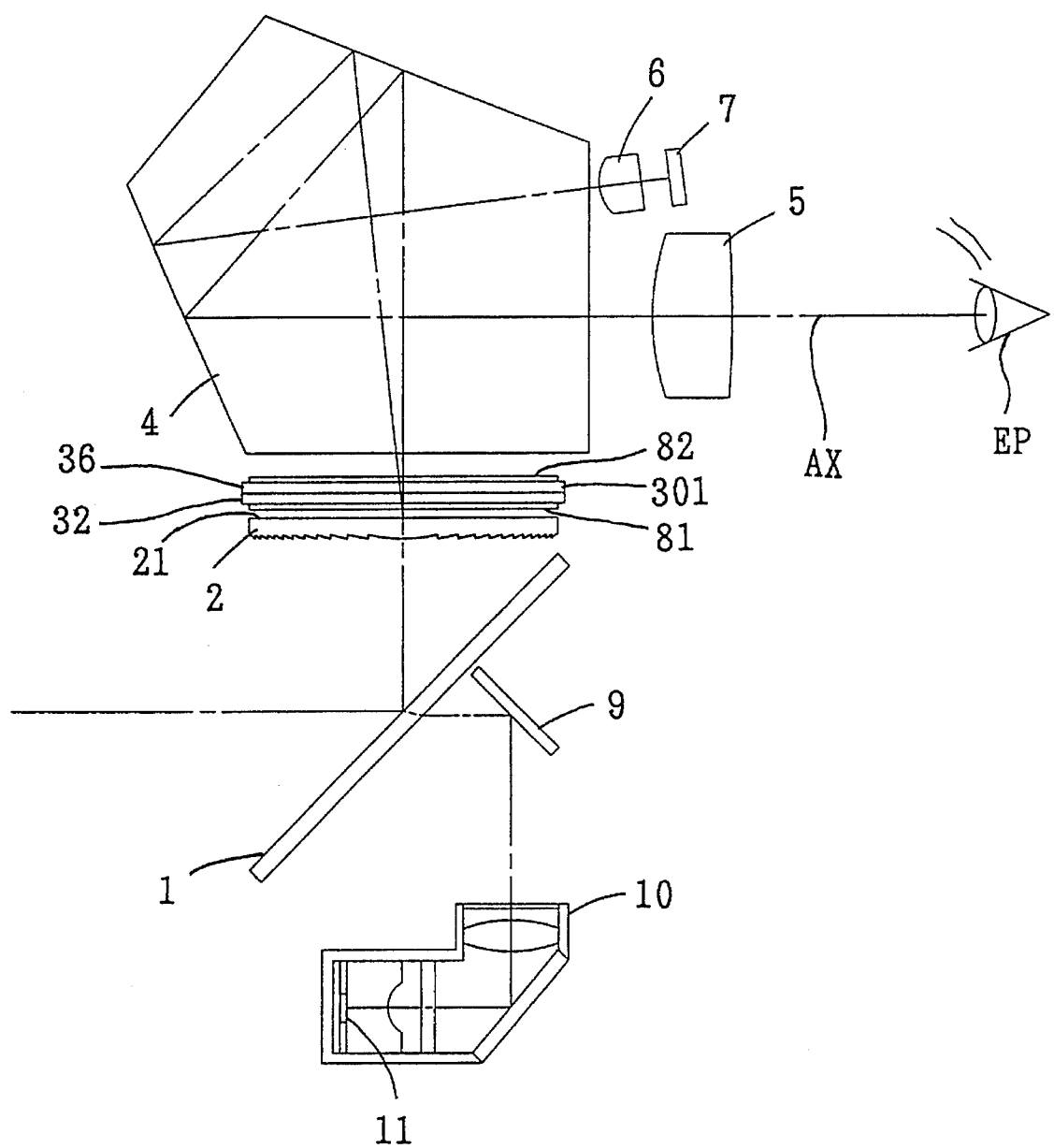
FIG. 2 is a cross-sectional view showing a finder optical system where a first prior art is employed.
Figure 3:
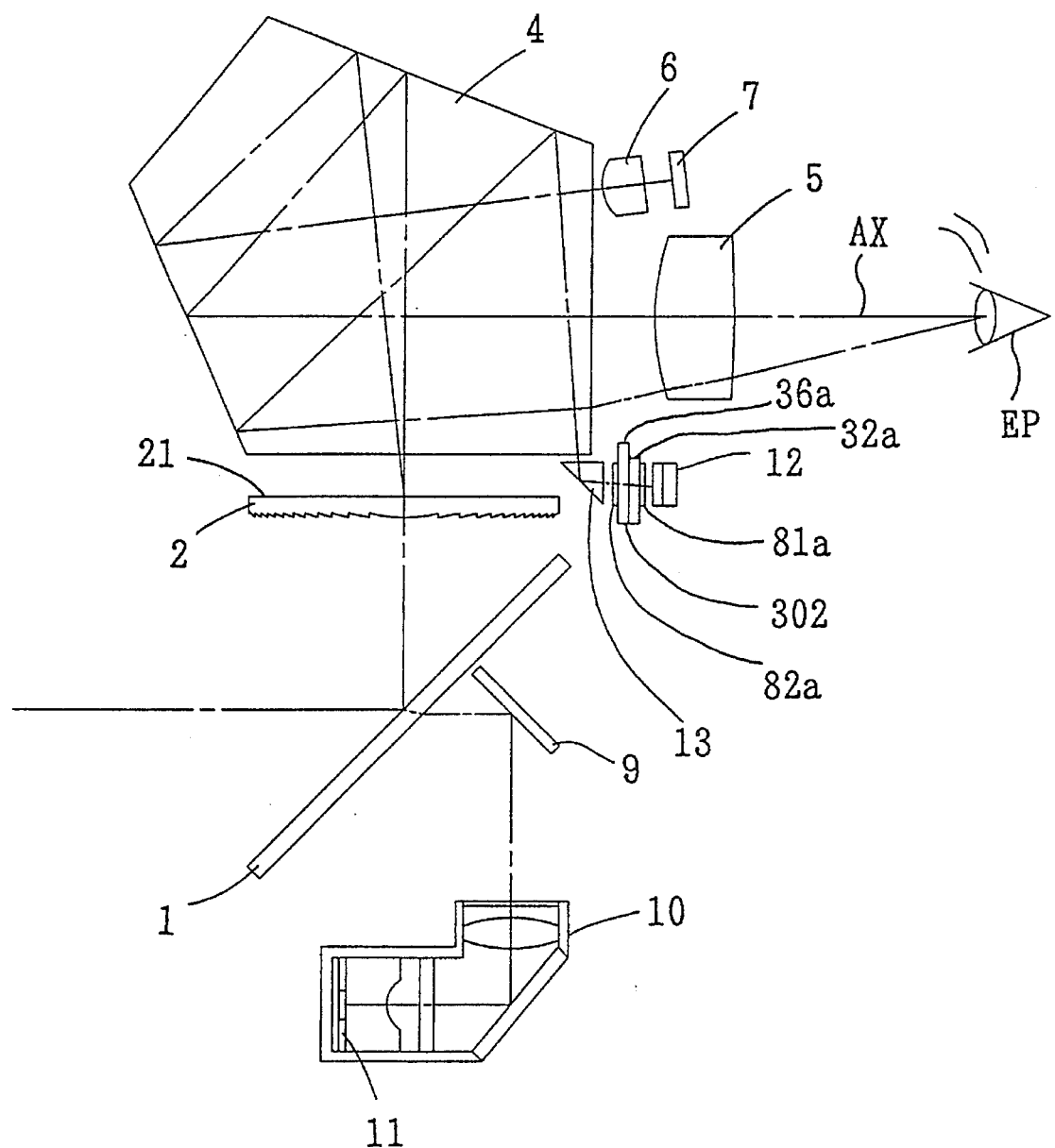
FIG. 3 is a cross-sectional view showing a finder optical system where a second prior art is employed.
Figure 4:
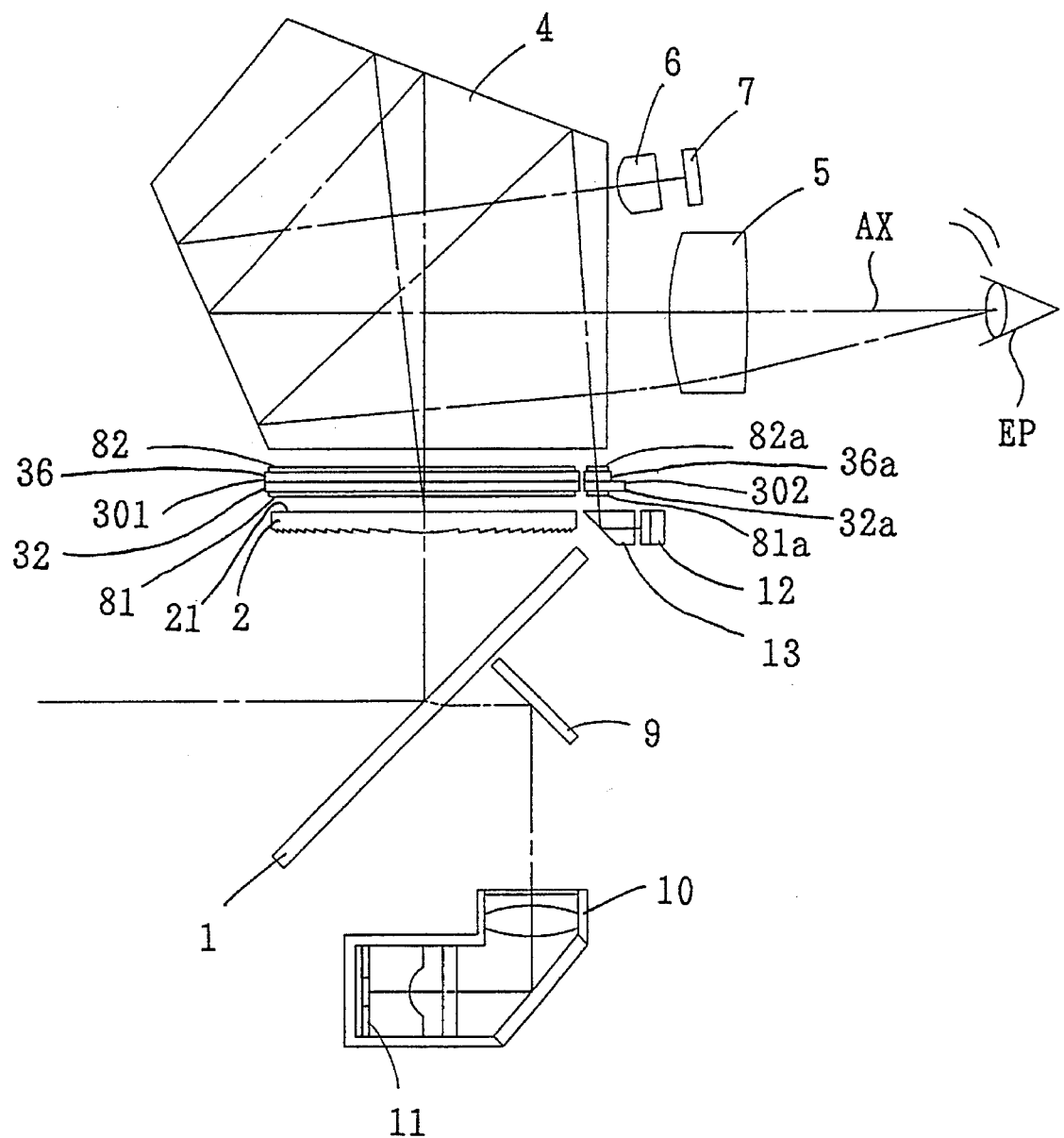
FIG. 4 is a cross-sectional view showing a finder optical system where a third prior art is employed.

As previously mentioned, a finder display apparatus using a TN liquid crystal device to which polarizing plates are attached as shown in FIG. 1 has already been known. In this embodiment, however, of the two polarizing plates (31 and 37 in FIG. 1) conventionally attached to the base plates so as to sandwich the TN liquid crystal device, a polarizing plate closer to the eye is arranged to be separate from the liquid crystal device. That is, with the arrangement of FIG. 5 where the polarizing plate 8 is attached to the exit surface 41 of the pentaprism 4, an advantage which cannot be obtained with the prior art is obtained as well as the same function as that of the prior art is achieved.

Moreover, according to this embodiment, since a luminous flux not having passed through the polarizing plate 8 is used for photometry, no influence is exerted on the luminous flux for photometry by the polarizing plate 8. That is, since the polarizing plate 8 is arranged to be separate from the electro-optical display device 3, no bad influence is exerted on the luminous flux for photometry by the polarizing plate 8 since a luminous flux not having passed through the polarizing plate 8 is used for photometry, and the deterioration of finder image quality due to flaws and dirt on the polarizing plate is reduced. As the polarizing plate 8, a small polarizing plate may be used which covers only the central portion of the luminous flux, since the polarizing plate 8 is arranged to be separate from the image plane. Since it is possible to use a polarizing plate much smaller than those used in the prior arts, the cost is reduced.

Further, in this embodiment, since a polarizing plate closer to the focusing screen 2 (that is, farther from the eye) is omitted by arranging the electro-optical display device 3 in accordance with the polarization characteristic of the main mirror 1, the size of the camera is reduced. That is, since the electro-optical display device is arranged to be closer to the focusing screen by the amount of the thickness of the polarizing plate, the difference between the finder dioptric power of the subject image and the dioptric power of the display is reduced, and the size of the camera is reduced. Moreover, since no polarizing plate is attached to the base plate 36, the reduction of the number of parts and the simplification of assembly are achieved. As a result, the cost is reduced, and no bad influence is exerted on the luminous flux for photometry.

Figure 9:
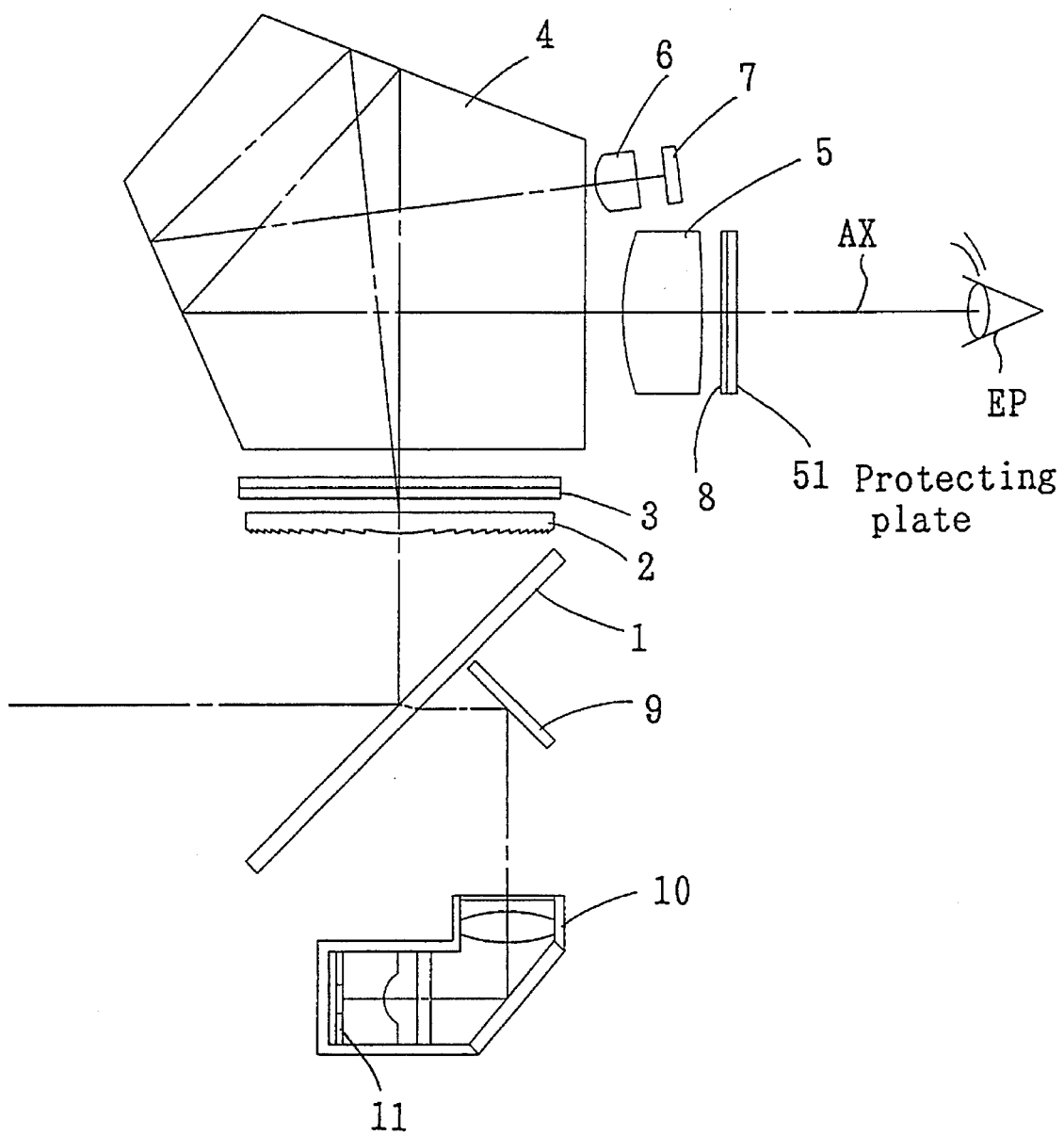
FIG. 9 is a cross-sectional view showing a finder optical system where a second embodiment of the present invention is employed.

FIG. 9 is a longitudinal cross-sectional view schematically showing a finder optical system for use in a single-lens reflex camera where a finder display apparatus which is a second embodiment of the present invention is employed. This embodiment is a variation of the above-described first embodiment, and has the same structure as that of the first embodiment except that the polarizing plate 8 is attached to the eyepiece side surface of a protecting plate 51 arranged on the pupil EP side of the eyepiece system 5 instead of attaching it to the exit surface 41 of the pentaprism 4.

In the case where the eyepiece system 5 has a dioptric power adjusting mechanism or a zooming mechanism, since the eyepiece system 5 includes a movable lens, a protecting plate 51 made of a parallel plate as shown in FIG. 9 is frequently arranged on the pupil EP side of the eyepiece system 5 for the purpose of protection in practical use. In this embodiment, the work capability in the assembly process is improved not only by providing the protecting plate 51 but also by arranging the polarizing plate 8 on the eyepiece side of the protecting plate 51. Consequently, even if the polarizing plate 8 is flawed or dirty, since the dioptric power is not adjusted with respect to the polarizing plate 8, the finder image quality does not deteriorate. Moreover, a small polarizing plate 8 can be used compared to the case where the polarizing plate 8 is attached to the exit surface 41 of the pentaprism 4.

Figure 10:
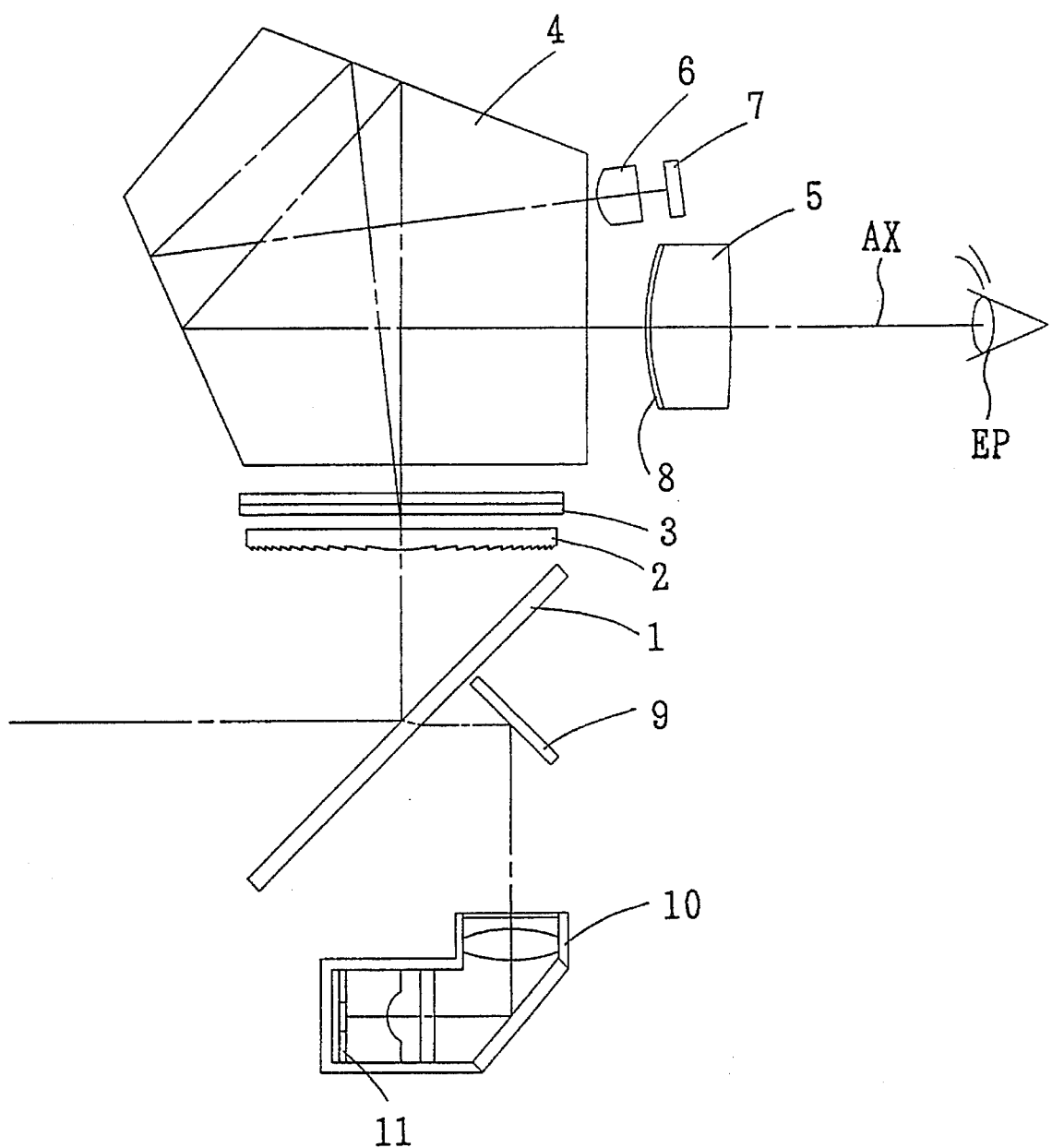
FIG. 10 is a cross-sectional view showing a finder optical system where a third embodiment of the present invention is employed.

FIG. 10 is a longitudinal cross-sectional view schematically showing a finder optical system for use in a single-lens reflex camera where a finder display apparatus which is a third embodiment of the present invention is employed. This embodiment is a variation of the above-described first embodiment, and has the same structure as that of the first embodiment except that the polarizing plate 8 is attached to the pentaprism 4 side surface of the eyepiece system 5 instead of attaching it to the exit surface 41 of the pentaprism 4.

In this embodiment, since the polarizing plate 8 is directly attached to the eyepiece system 5, it is unnecessary to provide a margin for the size of the polarizing plate 8 and the finder optical path with respect to a position shift of the polarizing plate. This arrangement enables the use of a smaller polarizing plate 8, and improves the work capability. Moreover, a finder optical system with this arrangement is easy to handle compared to the one where a large polarizing plate is attached to a large pentaprism. Further, since the polarizing plate 8 is attached to a surface of the eyepiece system 5 other than the pupil EP side surface thereof, it is prevented that the polarizing plate 8 gets flawed or dirty.

Figure 11:
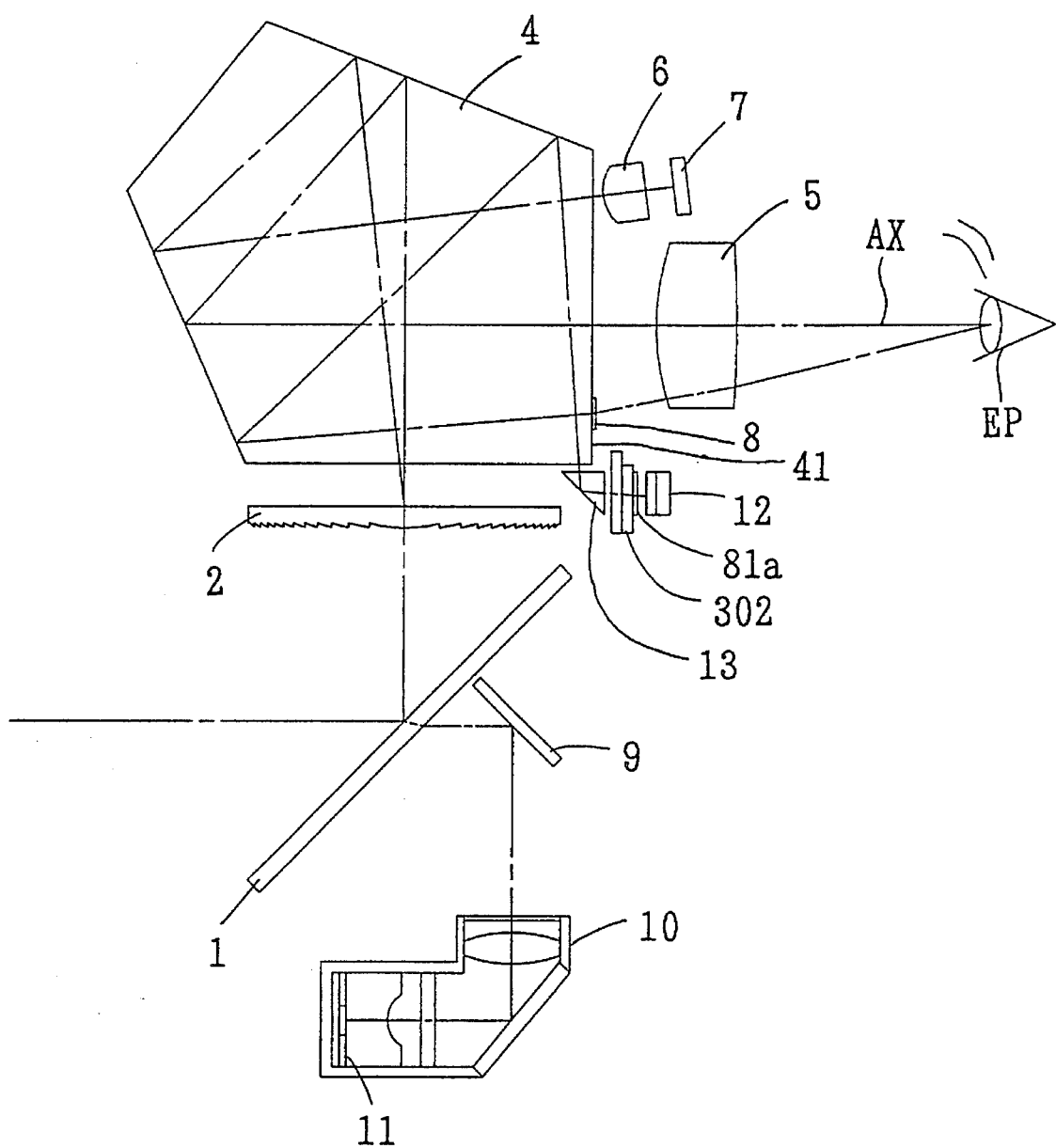
FIG. 11 is a cross-sectional view showing a finder optical system where a fourth embodiment of the present invention is employed.

FIG. 11 is a longitudinal cross-sectional view schematically showing a finder optical system for use in a single-lens reflex camera where a finder display apparatus which is a fourth embodiment of the present invention is employed. This embodiment has the same structure as that of the second prior art shown in FIG. 3 except that the polarizing plate 8 is attached to the exit surface 41 of the pentaprism 4 instead of attaching the polarizing plate 82a to the electro-optical display device 302.

By moving the polarizing plate 82a of the second prior art for the outside-image-plane display to a position shown at 8 in FIG. 11 (i.e. by providing the polarizing plate 8), a space occupied by the polarizing plate 82a can effectively be used. In the second prior art, the space where the finder display apparatus is arranged is very small. With the arrangement of this embodiment, however, since the space occupied by the polarizing plate 82a in the second prior art is vacated, the camera body is assembled more easily. Further, the deterioration of finder image quality due to flaws and dirt is prevented.

Figure 12:
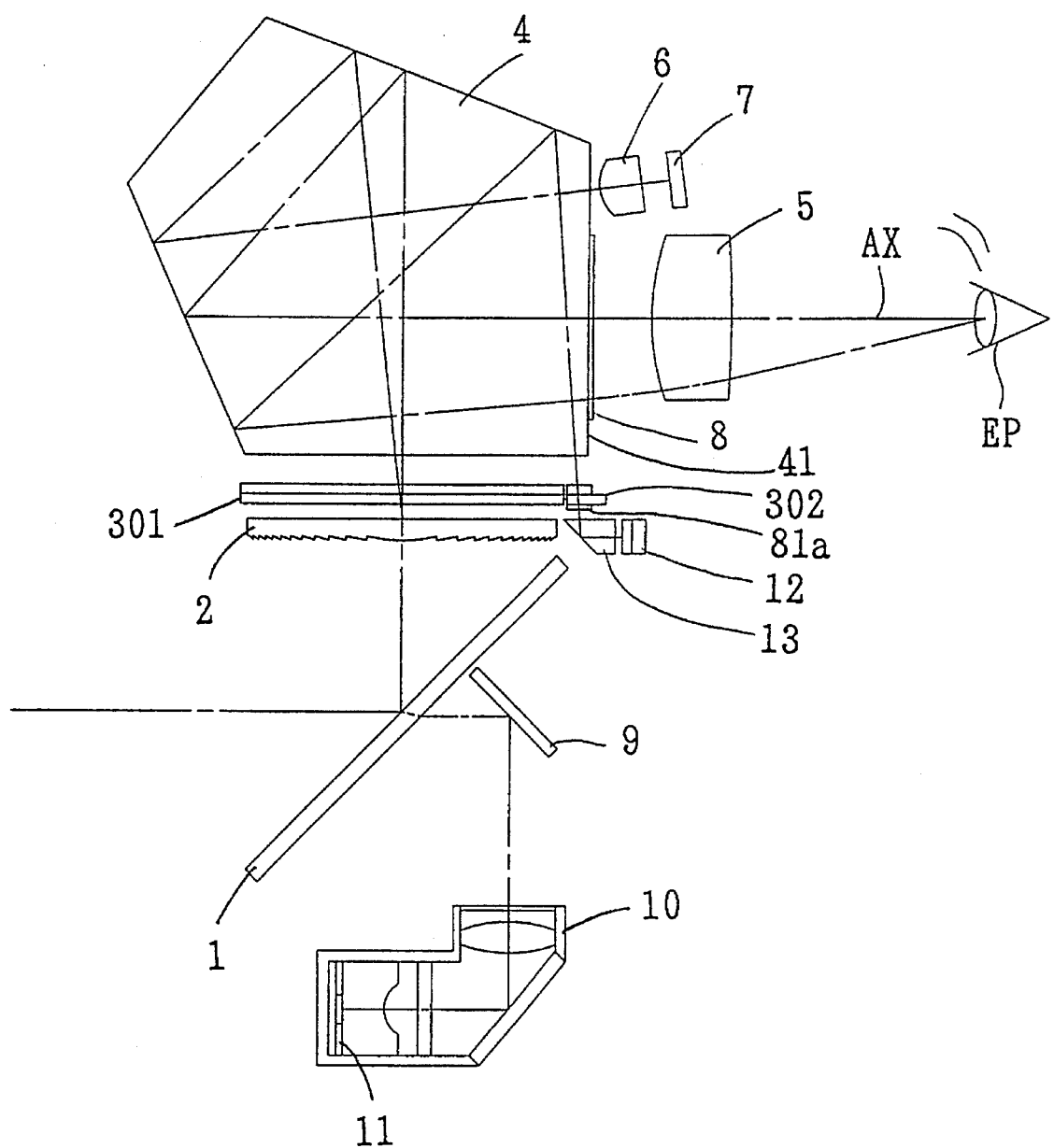
FIG. 12 is a cross-sectional view showing a finder optical system where a fifth embodiment of the present invention is employed.

FIG. 12 is a longitudinal cross-sectional view schematically showing a finder optical system for use in a single-lens reflex camera where a finder display apparatus which is a fifth embodiment of the present invention is employed. This embodiment has the same structure as that of the third prior art shown in FIG. 4 except that the polarizing plate 8 is attached to the exit surface 41 of the pentaprism 4 instead of attaching the polarizing plates 81 and 82 to the electro-optical display device 301 and attaching the polarizing plate 82a to the electro-optical display device 302. By omitting the polarizing plate 81 in FIG. 4 and by replacing the polarizing plates 82 and 82a with the polarizing plate 8, the same advantage as that of the first to fourth embodiments is obtained.

Figure 13:
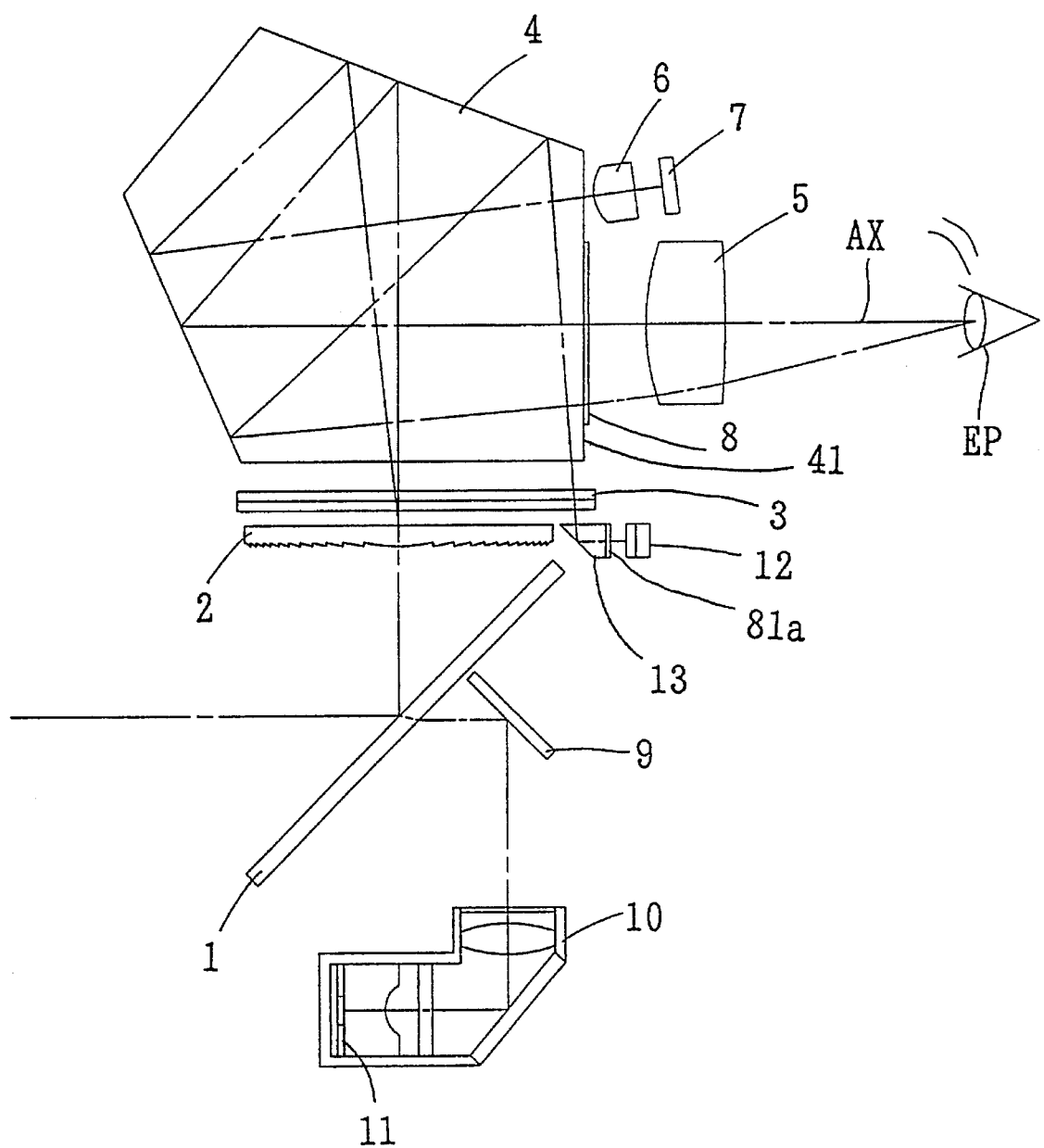
FIG. 13 is a cross-sectional view showing a finder optical system where a sixth embodiment of the present invention is employed.

FIG. 13 is a longitudinal cross-sectional view schematically showing a finder optical system for use in a single-lens reflex camera where a finder display apparatus which is a sixth embodiment of the present invention is employed. This embodiment is a variation of the above-described fifth embodiment, and has the same structure as that of the fifth embodiment shown in FIG. 12 except that the electro-optical device 301 for the within-image-plane display and the electro-optical device 302 for the outside-image-plane display are replaced by the electro-optical display device 3 for both the within-image-plane and outside-image-plane displays and that the polarizing plate 81a is provided to the display prism 13 (not to the electro-optical device 302).

While FIG. 13 shows an example where the polarizing plate 81a of FIG. 12 is attached to a surface of the display prism 13 on which light emitted from the lighting light source 12 is incident, the polarizing plate 81a may be arranged at a position corresponding to a position shown at 81a in FIG. 12 (fifth embodiment) or on the exit surface of the display prism 13 or at any position as far as the space inside the camera body can effectively be used.

Figure 14:
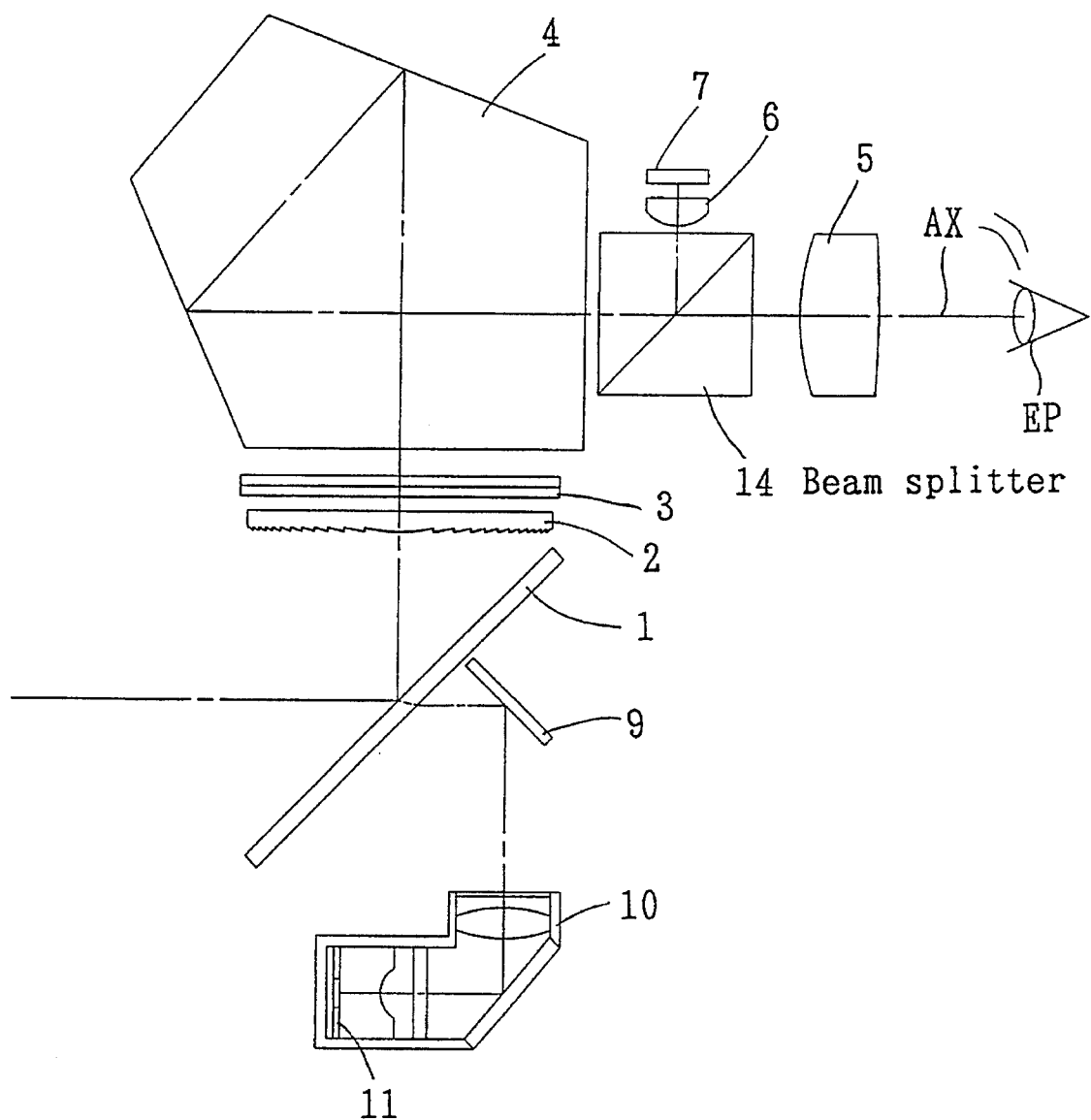
FIG. 14 is a cross-sectional view showing a finder optical system of a camera where a seventh embodiment of the present invention is employed.

FIG. 14 is a longitudinal cross-sectional view schematically showing a finder optical system for use in a single-lens reflex camera where a finder display apparatus which is a seventh embodiment of the present invention is employed. This embodiment has the same structure as that of the first embodiment shown in FIG. 5 except that a beam splitter 14 is arranged between the pentaprism 4 and the eyepiece system 5 instead of providing the polarizing plate 8.

In this embodiment, a part of a luminous flux forming a finder field (within the image plane) is extracted from the finder optical path through the beam splitter 14 and the extracted part of the luminous flux is used for photometry. The beam splitter 14 serves as a polarizing member similarly to the polarizing plate as well as divides a luminous flux to extract a luminous flux for photometry. The polarization characteristic of the beam splitter is not specifically described here, since it is known, for example, through Japanese Published Utility Model Application S34-10241 and Japanese Laid-open Patent Application S62-187802. In this embodiment, the use of the polarization characteristic of the beam splitter 14 enables the omission of the polarizing plate 82 used in the first and third prior arts. The polarizing plate 81 of the first and third prior arts is omitted since the polarization characteristic of the main mirror 1 is used similarly to the first embodiment.

Figure 15:
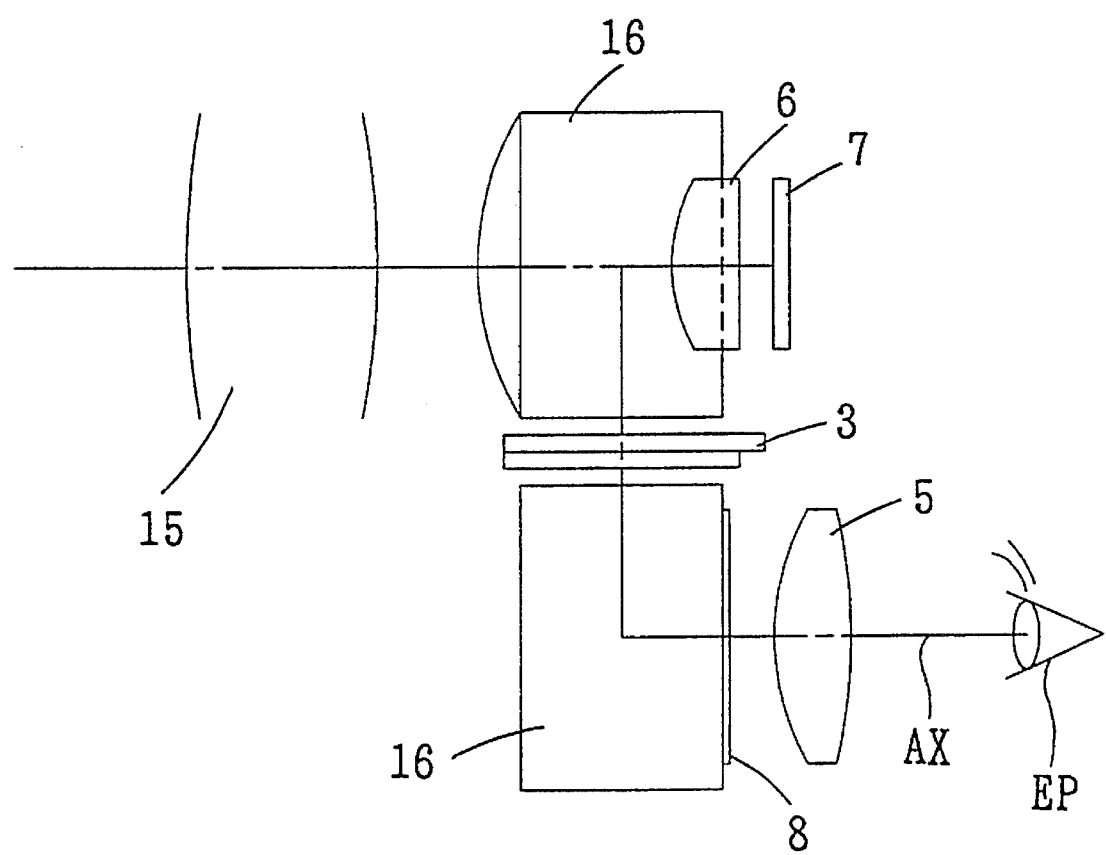
FIG. 15 is an upper view of a finder optical system where an eighth embodiment of the present invention is employed.
Figure 16:
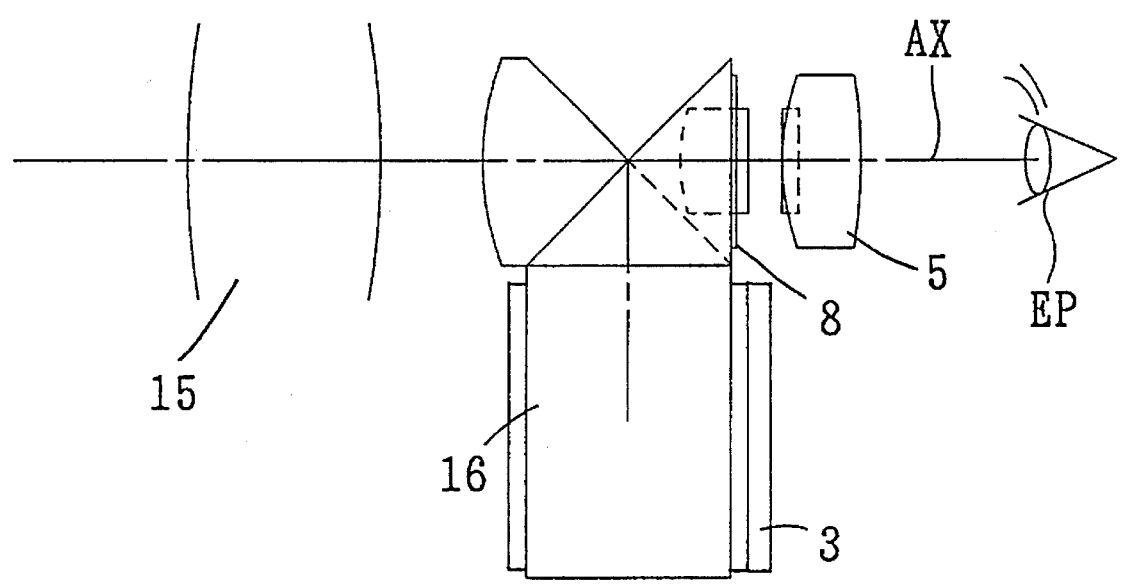
FIG. 16 is a side view of the finder optical system where the eighth embodiment of the present invention is employed.

FIGS. 15 and 16 are longitudinal cross-sectional views schematically showing a real-image-type finder optical system where a finder display apparatus which is an eighth embodiment of the present invention is employed. FIG. 15 is an upper view. FIG. 16 is a side view.

In FIGS. 15 and 16, 15 is a finder objective lens system, and 16 is a Porro prism constituted by two parts. The same elements as those of the above-described first to seventh embodiments are denoted by the same reference designations. As well known, the Porro prism is frequently used in a real-image-type finder optical system since it is capable of turning an image upside down and right way around with the combination of four reflecting surfaces in spite of its relatively small volume.

In this embodiment, a first reflecting surface of the Porro prism 16 from the subject side is made of a semitransparent mirror. Light from a subject is divided into light for photometry and light for finder field observation by the semitransparent mirror. That is, in FIGS. 15 and 16, light having passed through the finder objective lens 15 is incident on the Porro prism 16, and then reaches the first reflecting surface of the prism 16. Since the first reflecting surface is a semitransparent mirror, a part of the light passes through the semitransparent mirror and is directed through the photometric lens system 6 to the photometric light receiving device 7. Automatic exposure control by an exposure controlling circuit (not shown) is performed by use of an output from the light receiving device 7.

The remaining part of the light from the subject, i.e. the light vertically reflected downward by the first reflecting surface made of a semitransparent mirror is horizontally reflected at 90° by a second reflecting surface of the Porro prism 16, and then, exits from one of the two parts of the Porro prism 16 and reaches the electro-optical display device 3 arranged in a space between the two parts of the Porro prism 16. The polarizing plate (corresponding to the polarizing plate 81 of the first prior art shown in FIG. 2) of the electro-optical device 3 which is farther from the eye is omitted by using the polarization characteristic of the semitransparent mirror.

In this embodiment, the electro-optical display device 3 is arranged at a position which approximately coincides with a real image plane formed by the finder objective lens system 15. With this arrangement, both the information display and the subject image are viewed through the eyepiece system 5 at an appropriate finder dioptric power. The polarizing plate 8 attached to a rearmost surface of the Porro prism 16 (i.e. last reflecting surface of the Porro prism 16 through which light passes after passing through third and fourth reflecting surfaces of the prism 16) serves as the polarizing plate of the electro-optical display device 3 which is closer to the eye. This is similar to those of the previously-described first to third embodiments.

With the arrangement of this embodiment, although a conventional electro-optical device requiring two polarizing plates is used as the display device, the deterioration of finder image quality due to flaws and dirt on the polarizing plates is prevented, and a low-cost, compact finder display apparatus for use in a real-image-type finder optical system is realized.

Figure 17:
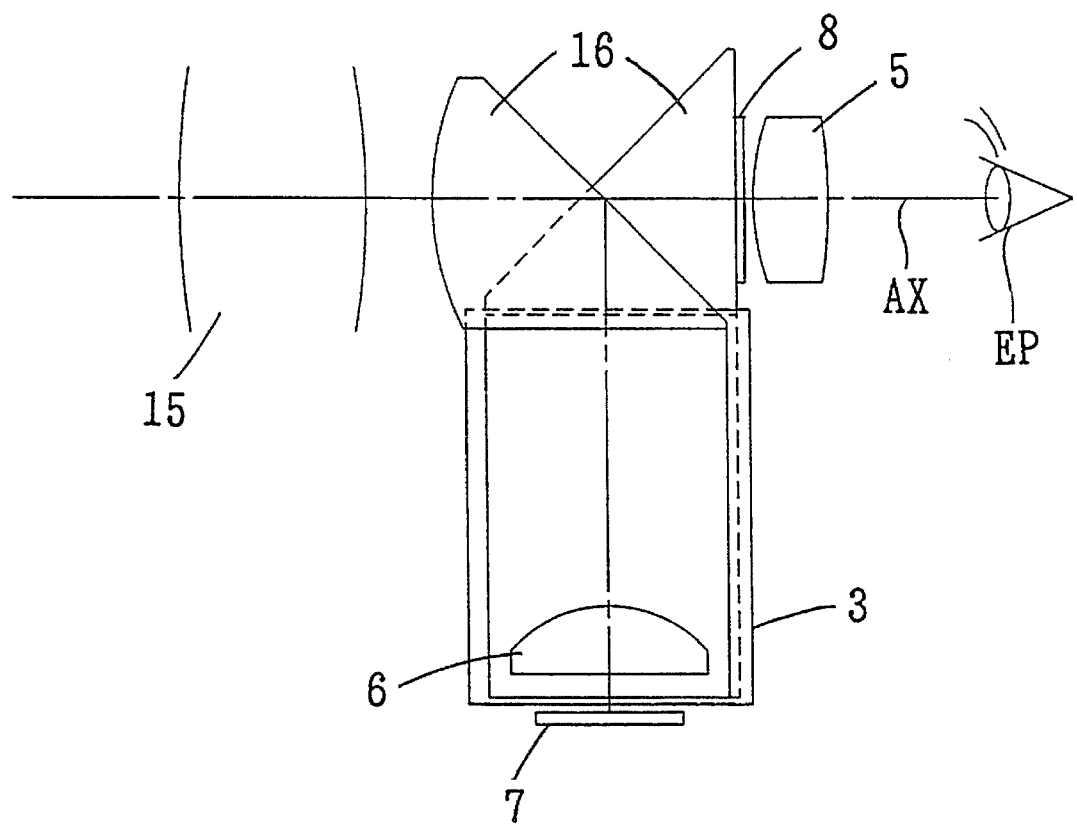
FIG. 17 is a side view of a finder optical System where a ninth embodiment of the present invention is employed.
Figure 18:
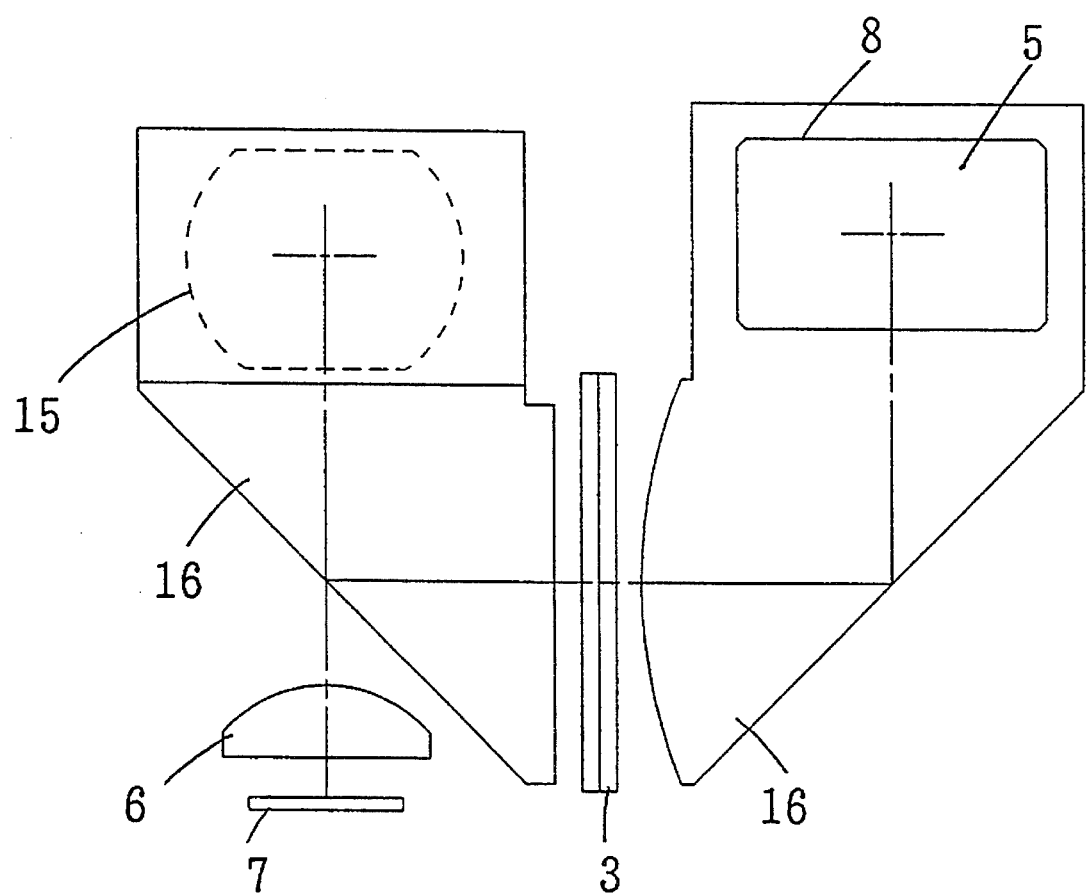
FIG. 18 is a rear view of the finder optical system where the ninth embodiment of the present invention is employed.

FIGS. 17 and 18 are longitudinal cross-sectional views schematically showing a real-image-type finder optical system where a finder display apparatus which is a ninth embodiment of the present invention is employed. FIG. 17 is a side view. FIG. 18 is a rear view viewed from the eyepiece side of the finder (from the rear side of the camera body). The reference designations in FIGS. 17 and 18 all denote the same elements as those shown in FIGS. 15 and 16.

In this embodiment, the second reflecting surface of the Porro prism 16 from the subject side is made of a semitransparent mirror. Light passing through the semitransparent mirror is used for photometry. This embodiment provide a finder display apparatus of a structure basically the same as that of the finder display apparatus according to the eighth embodiment except that the photometric optical system is arranged at a different position. In practice, from among various conditions considered according to the design of the entire camera body, a suitable one or one which enables the effective use of the space is selected.

Figure 19:
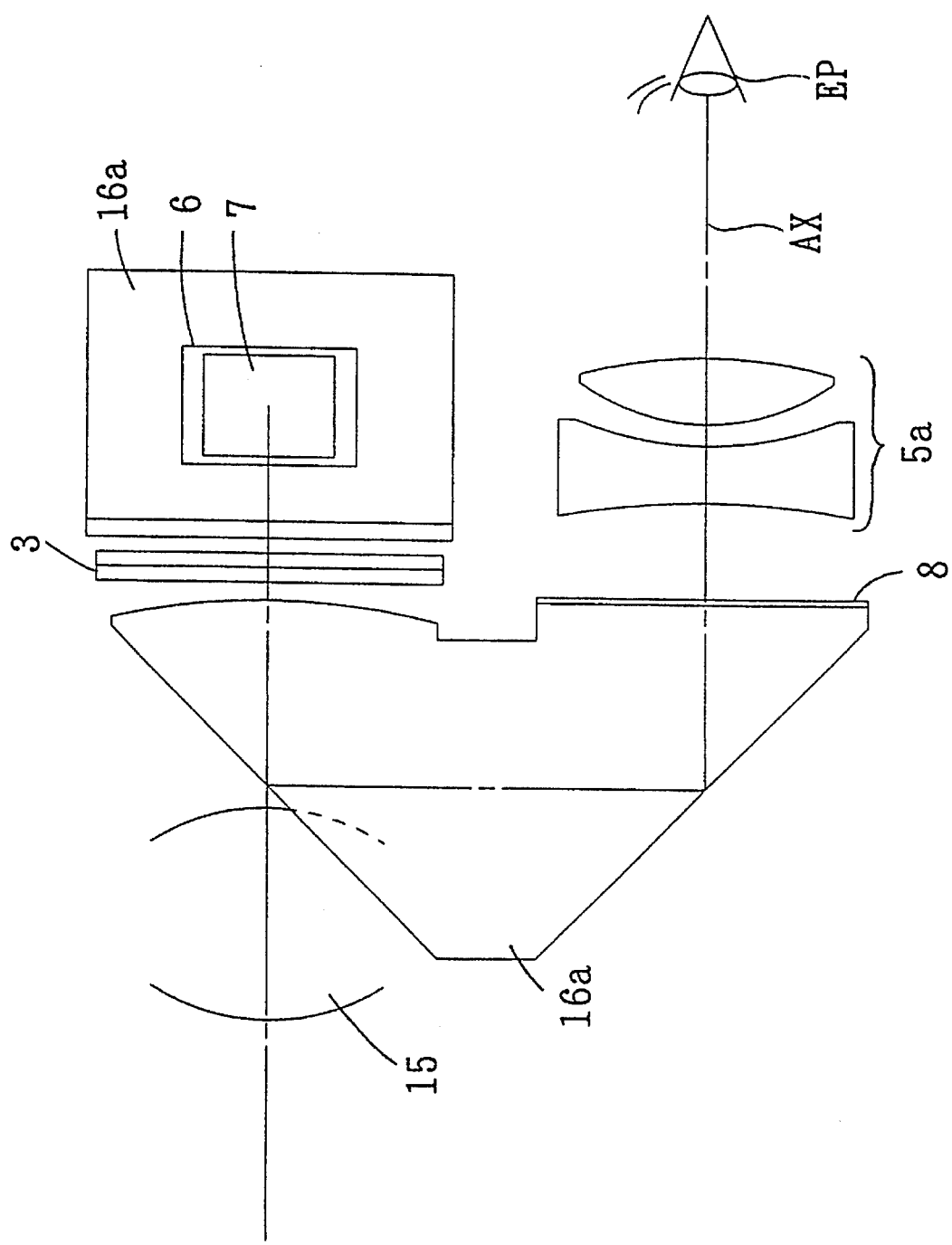
FIG. 19 is an upper view of a finder optical system where a tenth embodiment of the present invention is employed.
Figure 20:
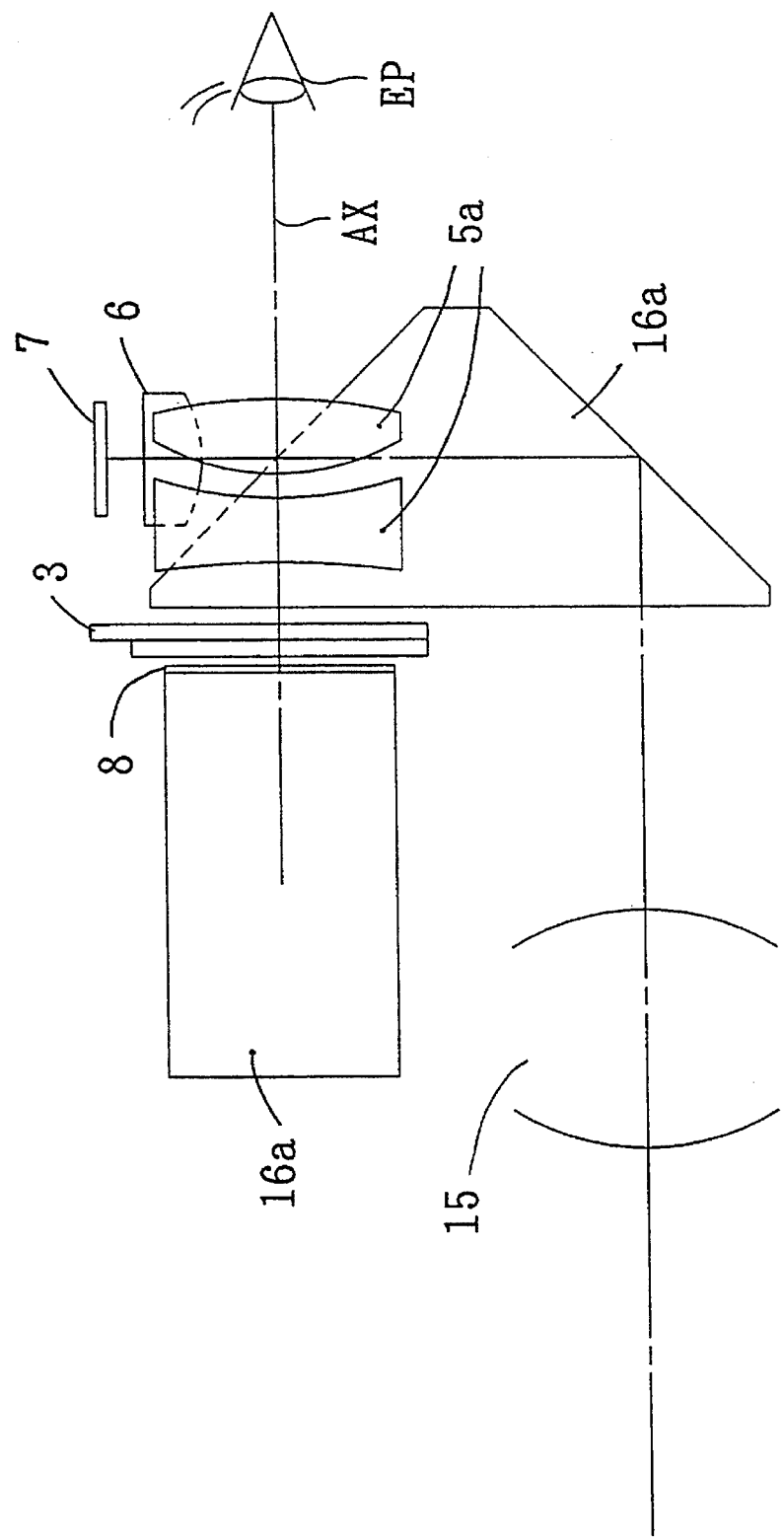
FIG. 20 is a side view of the finder optical system where the tenth embodiment of the present invention is employed.

FIGS. 19 and 20 are longitudinal cross-sectional views schematically showing a real-image-type finder optical system where a finder display apparatus which is a tenth embodiment of the present invention is employed. FIG. 19 is an upper view. FIG. 20 is a side view. The reference designations in FIGS. 19 and 20 all denote the same elements as those shown in FIGS. 15 to 16. In FIGS. 19 and 20, 16a is a Porro prism and 5a is an eyepiece system.

In this embodiment, similarly to the ninth embodiment, the second reflecting surface of the Porro prism is made of a semitransparent mirror. However, the structure of the Porro prism 16a is different from that of the Porro prism 16 of the eighth and ninth embodiments. Specifically, light from a subject is vertically reflected upward at 90° by the first reflecting surface, horizontally reflected frontward (toward the subject side) at 90° by the second reflecting surface, horizontally reflected in a lateral direction at 90° by the third reflecting surface, and horizontally reflected rearward (toward the eye) at 90° by the fourth reflecting surface.

While in the above-described eighth to tenth embodiments (FIGS. 15 to 20), the electro-optical display device 3 is of a size suitable for the within-image-plane display, it may be of a size suitable for the outside-image-plane display.

Figure 21:
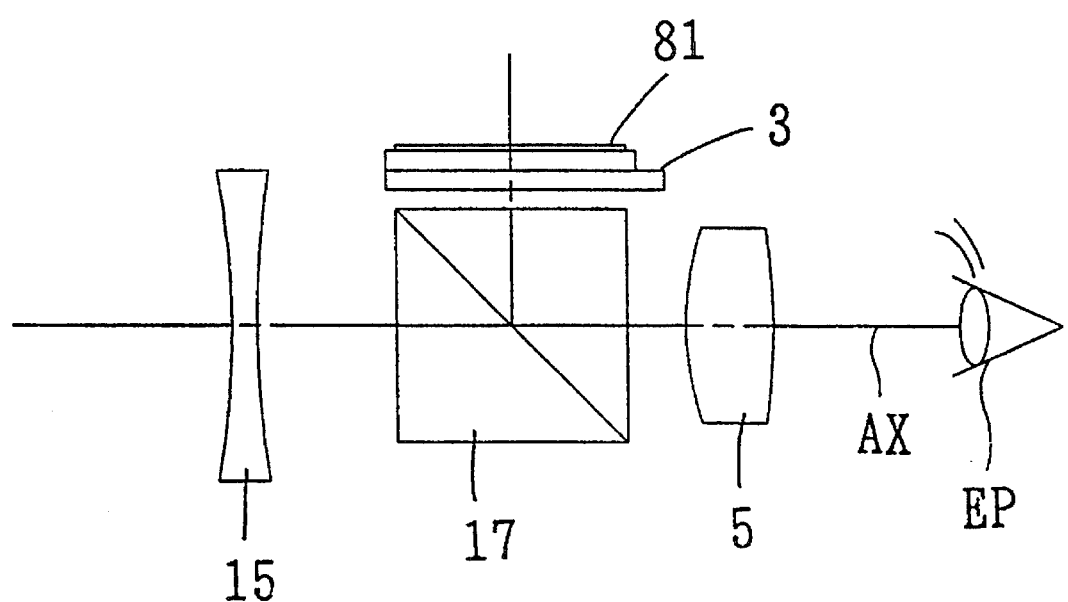
FIG. 21 is a cross-sectional view of a finder optical system where an eleventh embodiment of the present invention is employed.

FIG. 21 is a longitudinal cross-sectional view schematically showing a bright frame (lighting) inverted Galilean finder optical system where a finder display apparatus which is an eleventh embodiment of the present invention is employed. In FIG. 21, 15 is a finder objective lens system, 5 is an eyepiece system, 81 is a polarizing plate, 3 is an electro-optical display device, and 17 is a display prism. A lighting window or a light source for lighting arranged above the electro-optical display device 3 is not shown. In this embodiment, the polarizing plate of the electro-optical display device which is closer to the eye is omitted by using the polarization characteristic of a semitransparent surface of the display prism.

FIGS. 22 to 28 are longitudinal cross-sectional view schematically showing finder optical systems for use in single lens reflex cameras where finder display apparatuses which are twelfth to eighteenth embodiments of the present invention are employed. The twelfth to eighteenth embodiments are all examples where the present invention is employed in a finder optical system for use in a single-lens reflex camera having a function to change a format for printing, i.e. a pseudo zooming function.

The pseudo zooming function, which is known through. Japanese Laid-open Patent Application No. H3-2738, is a function with which a result similar to the result obtained by using a zoom lens is obtained on a printed photo by utilizing a trimming function at the time of printing. Major characteristics of the cameras having the pseudo zooming function are that a means is provided for displaying a trimming area within the finder field by some method and that a means is provided for recording information representative of a trimming area selected by the user onto film or a film cartridge in some form.

A relay zoom finder optical system for use in a single-lens reflex camera will hereinafter be described as an example of a finder optical system which copes with the pseudo zooming function and where the twelfth to eighteenth embodiments of the present invention are to be employed. The twelfth to eighteenth embodiments can be employed in a finder optical system for use in a single-lens reflex camera having an aspect ratio changing function.

Reference designations are in common in FIGS. 22 to 28, and denote the subsequently-mentioned elements. The same elements as those of the first to third prior arts and the first to eleventh embodiments are denoted by the same reference designations.

Numeral 1 is a main mirror, 2 is a focusing screen, 3 is an electro-optical display device, 5 is an eyepiece system, 6 is a photometric lens system, 7 is a photometric light receiving device, 8 is a polarizing plate, 9 is a sub mirror, 10 is a focusing optical system, 11 is a focusing light receiving device, 12 is a light source for lighting, 13 is a display prism, 18 is a taking lens system, 19 is a display prism, 20 is a display mirror, 51 is a protecting plate, 61 is a first condenser lens, 62 is a first mirror, 63 is a second mirror, 64 is an auxiliary relay lens system, 65 is a third mirror, 66 is a relay lens system, 67 is a fourth mirror, 68 is a second condenser lens, 69 is a light restricting plate (field frame), 70 is a fifth mirror, 71 is an information recorder, 72 is a film surface, 73 is a built-in flash emitting portion, 74 is a capacitor for flash, 81 and 82 are polarizing plates, and 302 is an electro-optical display device.

Figure 22:
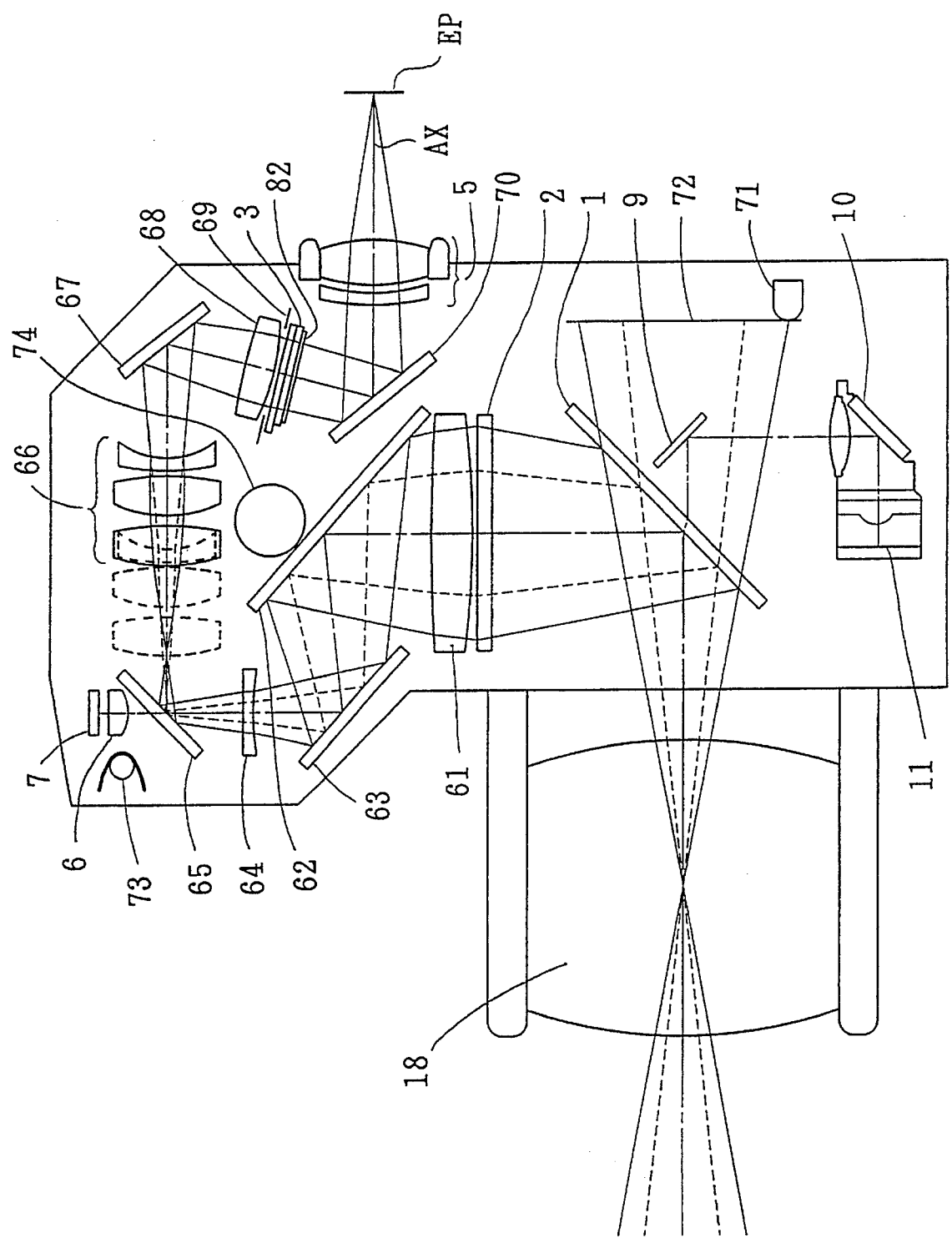
FIG. 22 is a cross-sectional view showing a finder optical system where a twelfth embodiment of the present invention is employed.

FIG. 22 is a longitudinal cross-sectional view schematically showing a relay zoom finder optical system for use in a single-lens reflex camera having the pseudo zooming function where a finder display apparatus which is the twelfth embodiment of the present invention is employed. Light from a subject passes through the taking lens 18 and is reflected by the main mirror 1 to form an image on the focusing screen 2. The finder optical system includes the relay lens system 66. The relay lens 66 re-forms the primary image formed on the focusing screen 2 (forms a secondary image) at the position of the light restricting plate 69. The image formation magnification of the secondary image is varied by zooming the relay lens system 66.

In FIG. 22, numerals 62, 63, 65, 67 and 70 are the first to fifth mirrors, which in corporation with the relay lens system 66 and the eyepiece system 5 converts a real image formed by the taking lens into a finder image (virtual image) which is an erecting image.

The third mirror 65 is a semitransparent mirror, which divide light from a subject which is reflected toward the finder optical system by the main mirror 1 into two parts. One part of the light is transmitted through the mirror 65 and used for photometry. The other part is reflected by the mirror 65 and used as a finder field luminous flux. In this embodiment, by using the polarization characteristic of the third mirror 65 which is a semitransparent mirror, the polarizing plate of the electro-optical display device 3 which is farther from the eye is omitted. The electro-optical display device 3 is arranged in the vicinity of the position where the secondary image is formed.

Figure 23:
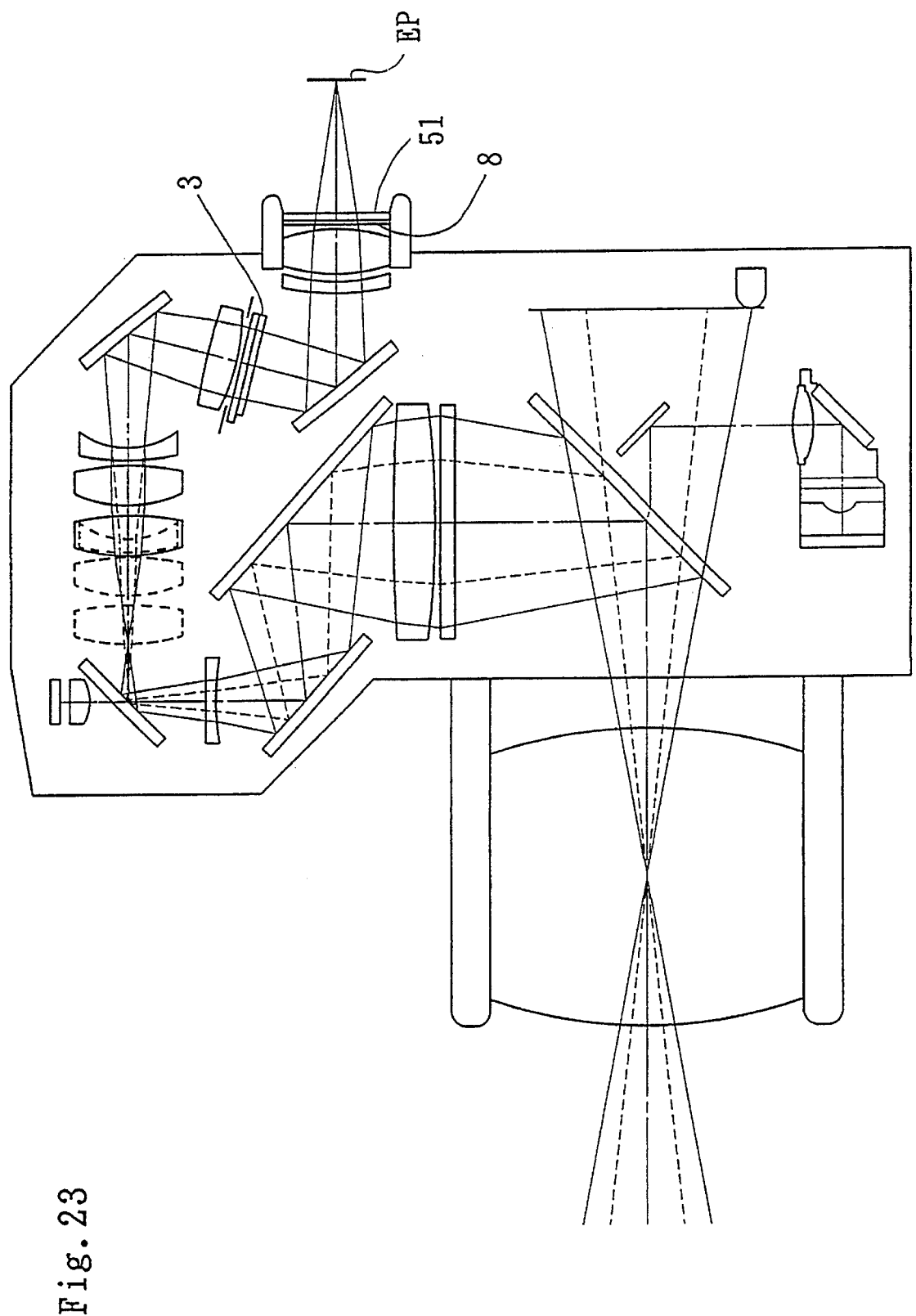
FIG. 23 is a cross-sectional view showing a finder optical system where a thirteenth embodiment of the present invention is employed.

FIG. 23 is a longitudinal cross-sectional view schematically showing a relay zoom finder optical system for use in a single-lens reflex camera having the pseudo zooming function where a finder display apparatus which is the thirteenth embodiment of the present invention is employed. This embodiment is a variation of the above-described twelfth embodiment of FIG. 22. In the case where the protecting plate 51 is provided on the outermost side (eye side) of the eyepiece system 5 for a reason, for example, that the eyepiece system 5 has a dioptric power adjusting mechanism, the polarizing plate 82 closer to the eye in the twelfth embodiment may be arranged on the farther-from-the-eye-side (camera body side) surface of the protecting plate 51. With this arrangement, the work capability in the assembly process is high and a small polarizing plate can be used compared to the case where the polarizing plate is directly attached to the electro-optical display device 3. Moreover, a finder optical system easier to handle is realized with a lower cost.

Figure 24:
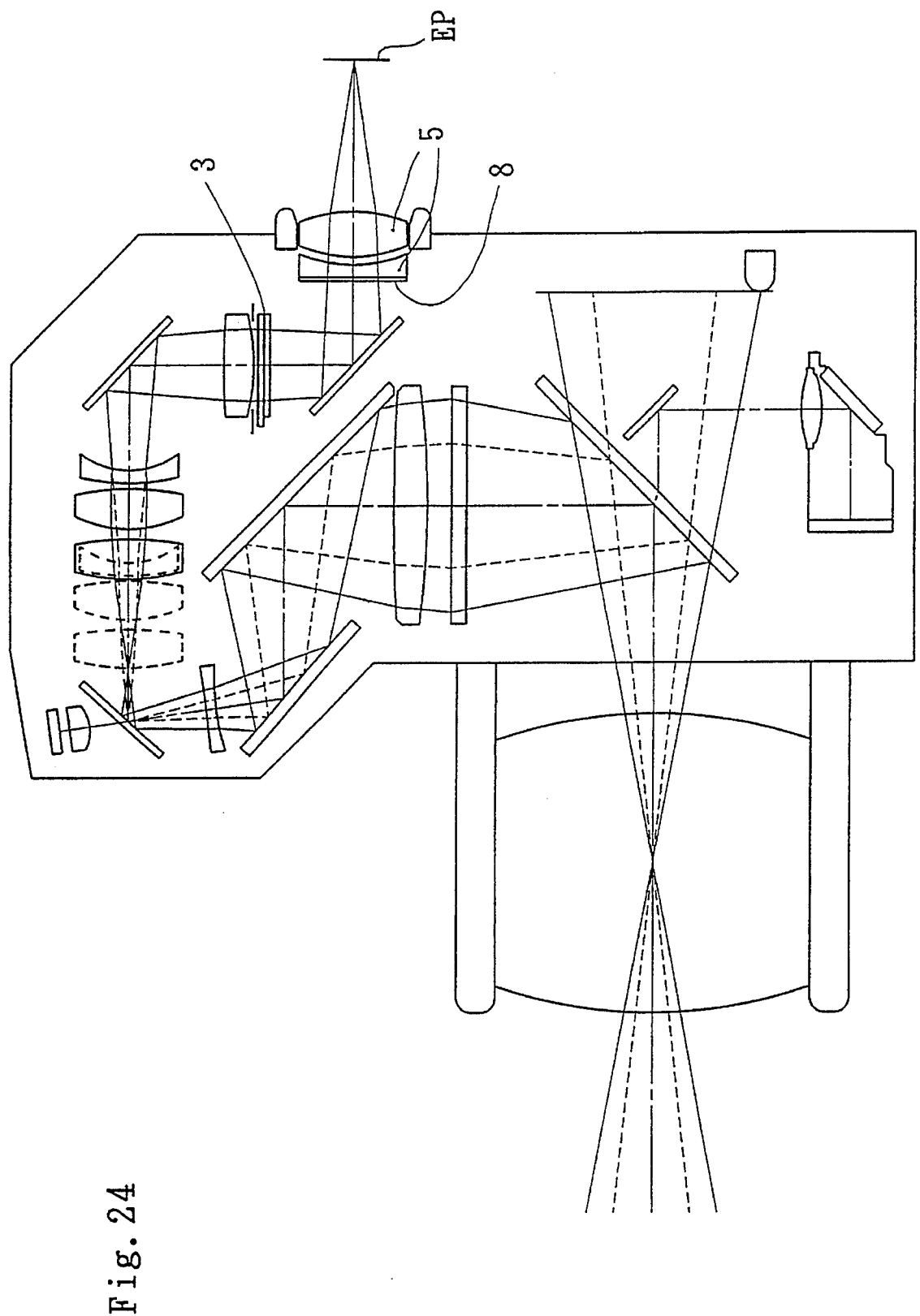
FIG. 24 is a cross-sectional view showing a finder optical system where a fourteenth embodiment of the present invention is employed.

FIG. 24 is a longitudinal cross-sectional view schematically showing a relay zoom finder optical system for use in a single-lens reflex camera having the pseudo zooming function where a finder display apparatus which is the fourteenth embodiment of the present invention is employed. In this embodiment, which is a variation of the above-described twelfth embodiment of FIG. 22, the polarizing plate 82 of the twelfth embodiment is provided on either of the lens surfaces of the eyepiece system 5. According to this embodiment, a smaller polarizing plate can be used, and the work capability associated with the electro-optical display device improves.

Figure 25:
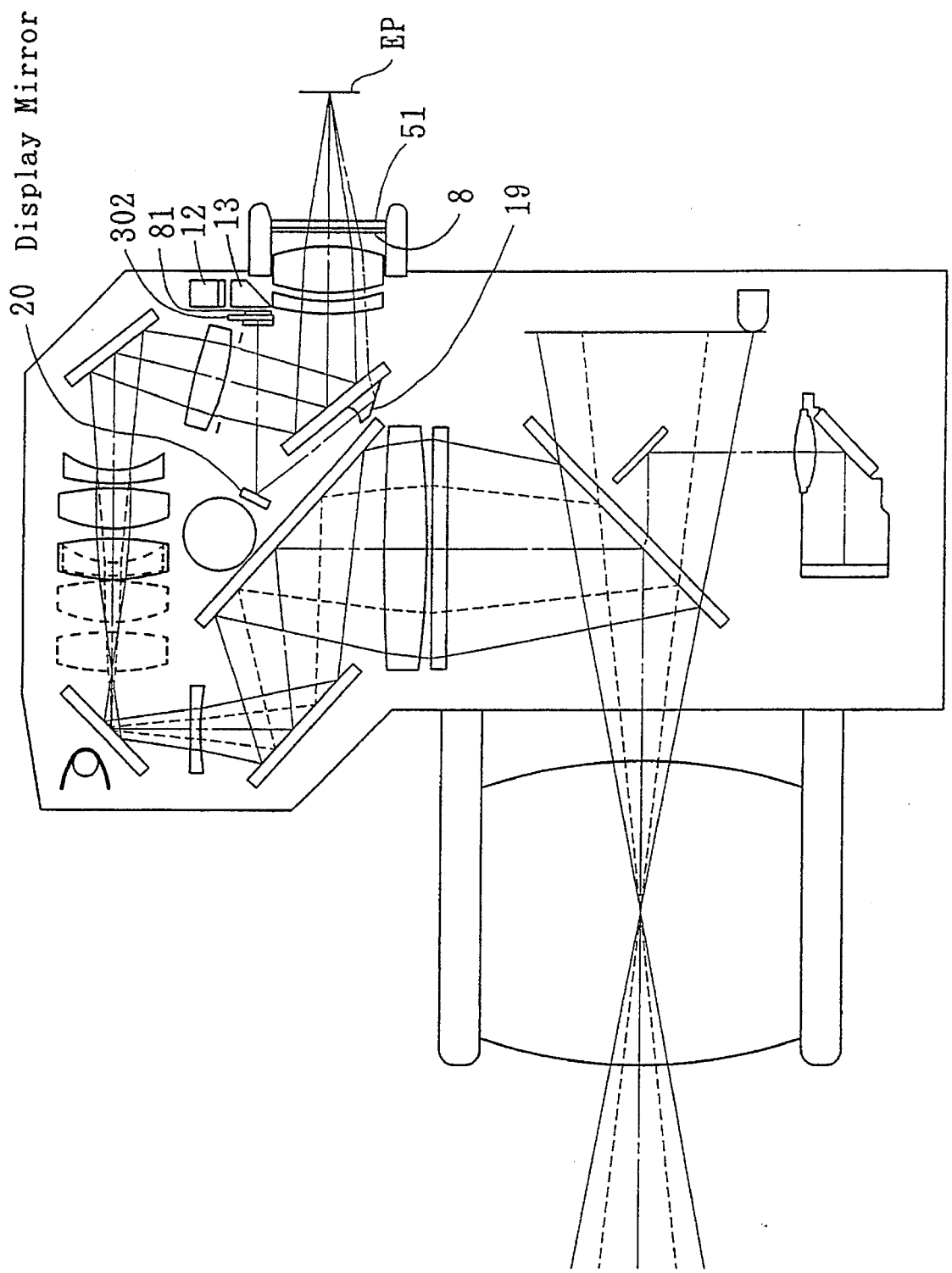
FIG. 25 is a cross-sectional view showing a finder optical system where a fifteenth embodiment of the present invention is employed.

FIG. 25 is a longitudinal cross-sectional view schematically showing a relay zoom finder optical system for use in a single-lens reflex camera having the pseudo zooming function where a finder display apparatus which is the fifteenth embodiment of the present invention is employed. In this embodiment, the present invention is employed for a finder display apparatus for the outside-image-plane display. Of the two polarizing plates, the one closer to the eye is arranged to a position shown at 8 in FIG. 25.

Figure 26:
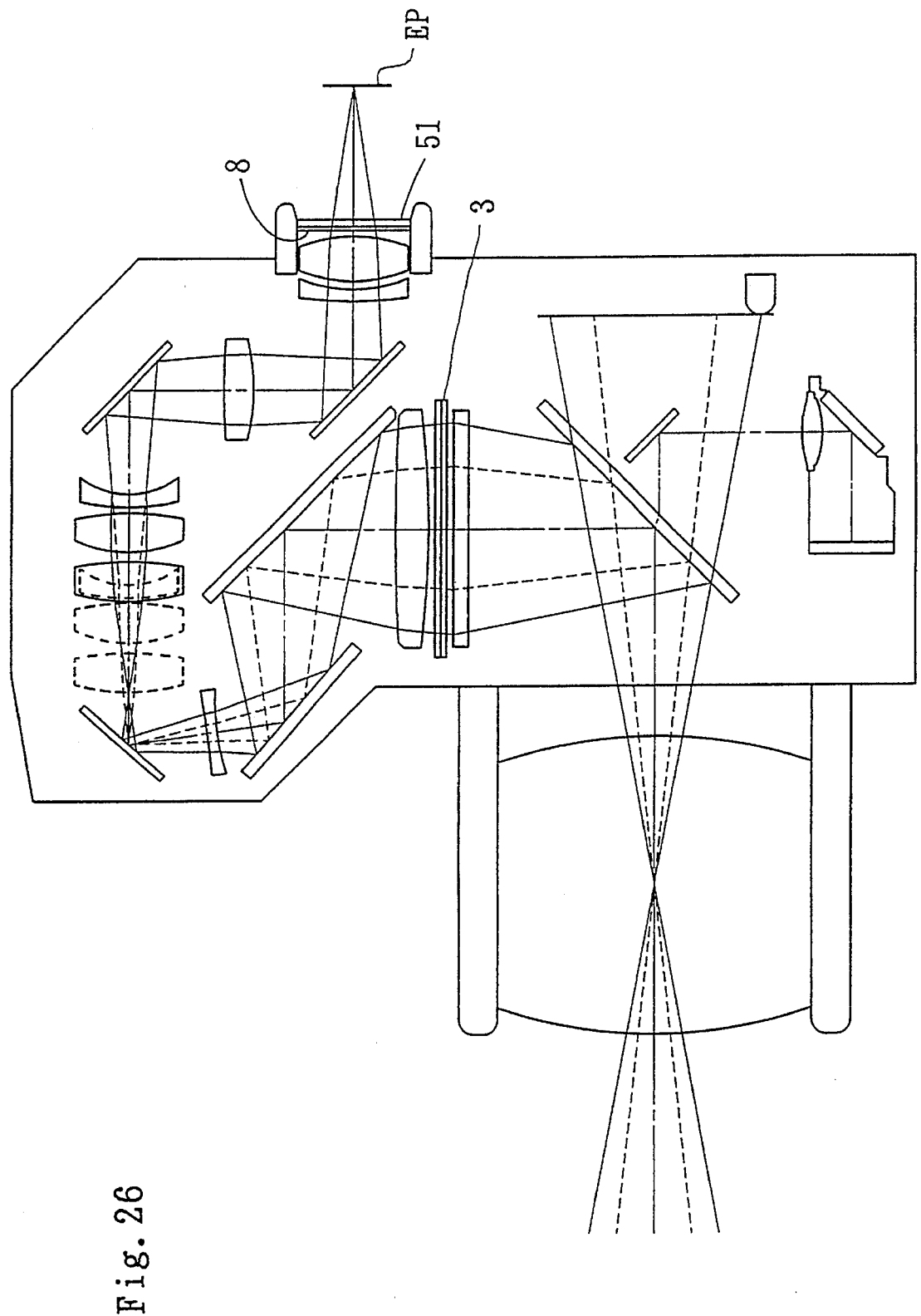
FIG. 26 is a cross-sectional view showing a finder optical system where a sixteenth embodiment of the present invention is employed.
Figure 27:
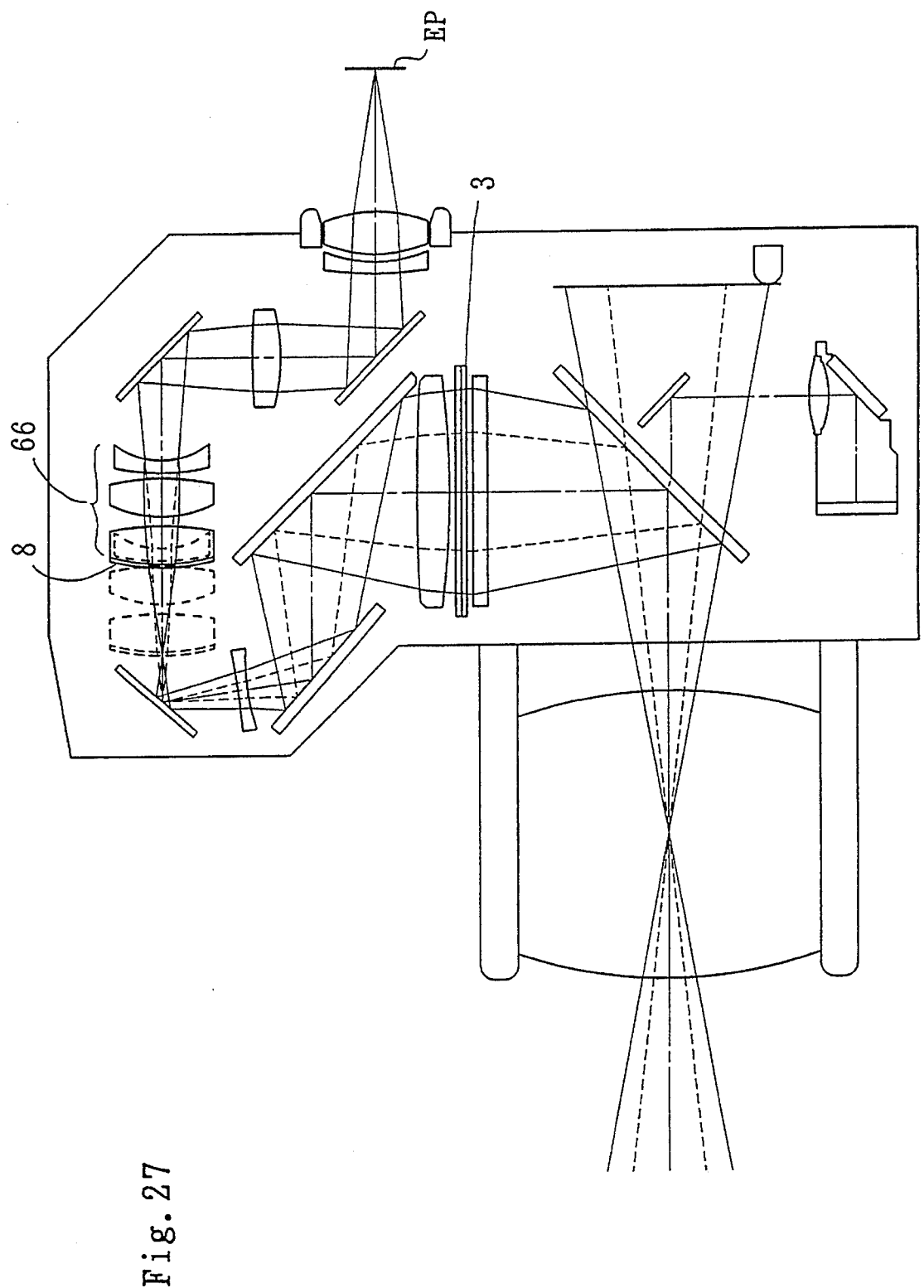
FIG. 27 is a cross-sectional view showing a finder optical system where a seventeenth embodiment of the present invention is employed.
Figure 28:
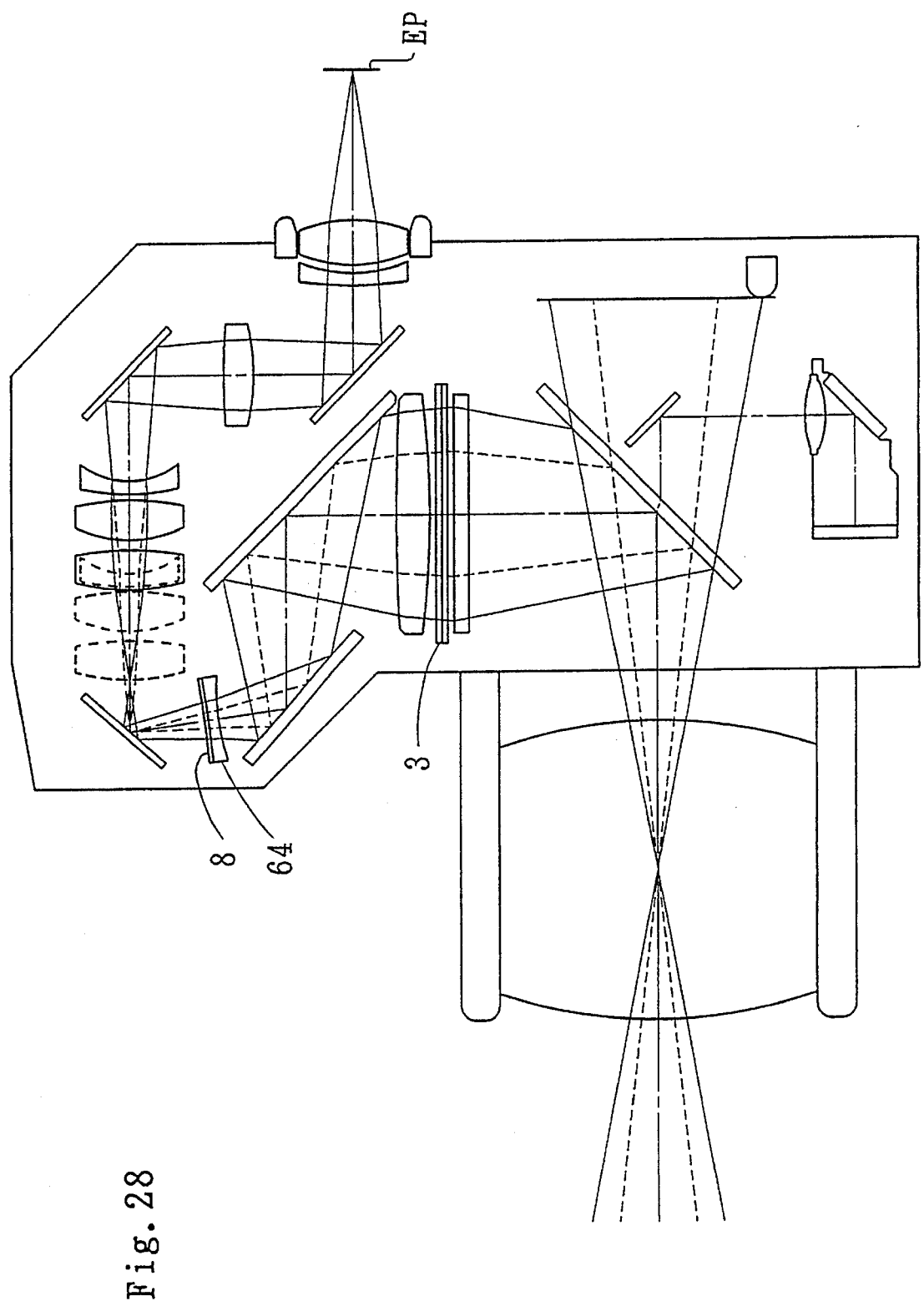
FIG. 28 is a cross-sectional view showing a finder optical system where an eighteenth embodiment of the present invention is employed.

FIGS. 26 to 28 are longitudinal cross-sectional views schematically showing finder optical systems for use in single-lens reflex cameras where finder display apparatuses which are the sixteenth to eighteenth embodiments of the present invention are employed. These embodiments are all examples where the electro-optical display device 3 is arranged in the vicinity of a surface where a primary image is formed. Although a smaller electro-optical display device 3 can be used if it is arranged in the vicinity of a secondary image plane, there are cases where the device 3 is arranged on the primary image plane according to the relationship with the space or the layout in the camera body or according to the content of the display. In the sixteenth embodiment shown in FIG. 26, the polarizing plate 8 is attached to the protecting plate 51. In the seventeenth embodiment shown in FIG. 27, the polarizing plate 8 is attached to a lens surface of the relay lens system 66. While the polarizing plate may be attached to any of the lens surfaces of the relay lens system 66, it is preferable to attach it to a lens surface having a large radius of curvature. In the eighteenth embodiment shown in FIG. 28, the polarizing plate 8 is attached to a lens surface of the auxiliary relay lens system 64. In this case, it is also preferable to attach it to a lens surface having a large radius of curvature.

As described above, as the finder optical system, one provided with a relay lens system may be used, and one where the polarizing plate closer to the eye is arranged in the vicinity of the relay lens system may be used. While the above-described twelfth to eighteenth embodiments of FIGS. 22 to 28 are all examples where finder display apparatuses of the present invention are employed in finder optical systems for use in single-lens reflex cameras having the pseudo zooming function, the employment of the present invention is not limited to finder optical systems for use in cameras having the pseudo zooming function or relay zoom finder optical systems; it is apparent that the present invention is employable in any finder optical systems as far as they have a relay lens system.

The advantage mentioned in the above description of the first embodiment is obtained in any of the second to eighteenth embodiments. Thus, the problems encountered by the first to third prior arts are solved.

Obviously, many modifications and variations of the present invention are possible in light of the above teachings. It is therefore to be understood that within the scope of the appended claims, the invention may be practiced other than as specifically described.

TABLE 1

Example of Structure of Dielectric Multilayer Film
(Angle of Incidence = 45°, $\lambda$ = 550 nm)

| Layer | Refractive index | Film thickness | Material |
|---|---|---|---|
| 1 | 2.100 | 0.25$\lambda$ | Mixed crystal of $ZrO_2$ and $TiO_2$ |
| 2 | 1.385 | 0.25$\lambda$ | $MgF_2$ |
| 3 | 2.100 | 0.25$\lambda$ | Mixed crystal of $ZrO_2$ and $TiO_2$ |
| 4 | 1.385 | 0.25$\lambda$ | $MgF_2$ |
| 5 | 2.100 | 0.50$\lambda$ | Mixed crystal of $ZrO_2$ and $TiO_2$ |
| Substrate | 1.500 | | |

What is claimed is:

1. A finder display apparatus for providing a display within a finder field, said finder display apparatus being provided in a real-image-type finder optical system for obtaining an erecting image by use of a Porro prism, said finder display apparatus comprising:

a reflecting surface provided to the Porro prism, said reflecting surface having a polarization characteristic;

a polarizing plate having a polarization characteristic different by 90° from the polarization characteristic of said reflecting surface; and an electro-optical display device constituted by a twisted nematic liquid crystal arranged between said reflecting surface and said polarizing plate.

2. A finder display apparatus as claimed in claim 1, wherein said reflecting surface divides a luminous flux into light for photometry and light for a subject image.

3. A finder display apparatus for providing a display within a finder field, said finder display apparatus being provided in a bright frame inverted Galilean finder optical system, said finder display apparatus comprising:

a semitransparent surface provided to a display prism, said semitransparent surface having a polarization characteristic, transmitting a subject image therethrough and directing a display content to an eyepiece;

a polarizing plate having a polarization characteristic different by 90° from the polarization characteristic of said semitransparent surface; and an electro-optical display device constituted by a twisted nematic liquid crystal arranged between said semitransparent surface and said polarizing plate.

4. A finder display apparatus for providing a display within a finder field in a single-lens reflex camera by arranging an electro-optical display device between two polarizing members, said finder display apparatus being arranged in a finder optical system, comprising:

a focusing screen;

a pentagonal roof prism; and a twisted nematic liquid crystal, which is used as said electro-optical display device, wherein said two polarizing members transmit therethrough only light having a predetermined polarization direction, and are arranged separately from said twisted nematic liquid crystal, and said twisted nematic liquid crystal is arranged between said focusing screen and said pentaprism.

5. A finder display apparatus as claimed in claim 4, said twisted nematic liquid crystal including a first twisted nematic liquid crystal arranged for providing a display superimposed on a subject image and a second twisted nematic liquid crystal arranged for providing a display outside an image plane, said second twisted nematic liquid crystal being arranged in a vicinity of said first twisted nematic liquid crystal.

6. A finder display apparatus as claimed in claim 4, wherein said twisted nematic liquid crystal is arranged between a focusing screen and a pentagonal roof prism of a single-lens reflex camera, said twisted nematic liquid crystal being used for both providing a display superimposed on a subject image and providing a display outside an image plane.

7. A finder display apparatus as claimed in claim 4, wherein one of said two polarizing members is arranged on an optical transmission surface arranged on an eyepiece side of said twisted nematic liquid crystal.

8. A finder display apparatus as claimed in claim 7, wherein said one of the two polarizing members is arranged at a position where no luminous flux used for photometry passes.

9. A finder display apparatus as claimed in claim 7, wherein said one of the two polarizing members is a polarizing plate arranged on an exit surface of a pentagonal roof prism.

10. A finder display apparatus as claimed in claim 7, wherein said one of the two polarizing members is a polarizing plate arranged on a surface of a protecting plate provided on a pupil side of an eyepiece.

11. A finder display apparatus as claimed in claim 7, wherein said one of the two polarizing members is a polarizing plate arranged on a lens surface of an eyepiece.

12. A finder display apparatus as claimed in claim 7, wherein said one of the two polarizing members is a polarizing plate arranged on a last exit surface of a Porro prism in a real-image-type finder optical system for obtaining an erecting image by use of the Porro prism.

13. A finder display apparatus as claimed in claim 4, wherein one of said two polarizing members is arranged in an optical member arranged on an objective lens side of the twisted nematic liquid crystal.

14. A finder display apparatus as claimed in claim 13, wherein said one of the two polarizing members is a semitransparent surface formed on a surface of a main mirror, said semitransparent surface having a polarization characteristic and a characteristic to semi-transmit light.

15. A finder display apparatus as claimed in claim 13, wherein said one of the two polarizing members is a semitransparent surface formed on a first reflecting surface or a second reflecting surface of a Porro prism in a real-image-type finder optical system for obtaining an erecting image by use of the Porro prism, said semitransparent surface having a characteristic to semi-transmit light.

16. A finder display apparatus as claimed in claim 4, wherein one of said polarizing members is arranged between a pentagonal roof prism and an eyepiece.

17. A finder display apparatus as claimed in claim 16, wherein said one of the two polarizing members is a beam splitter transmitting therethrough a subject image and a display content, said beam splitter having a characteristic to reflect a part of light constituting the subject image.

18. A finder display apparatus as claimed in claim 17, wherein said part of the light reflected by the beam splitter is used for photometry.

19. A finder display apparatus as claimed in claim 16, wherein said polarizing member is a display prism transmitting a subject image therethrough, said display prism directing a display content to the eyepiece.

20. A finder display apparatus for providing a display within a finder field by arranging an electro-optical display device between two polarizing members, said finder display apparatus being arranged in a finder optical system and including a prism, comprising:

a twisted nematic liquid crystal is used as said electro-optical display device, and wherein said two polarizing members transmit therethrough only light having a predetermined polarization direction, and are arranged separately from said twisted nematic liquid crystal.

21. The finder display apparatus as claimed in claim 20, wherein said twisted nematic liquid crystal is arranged between two parts constituting a Porro prism of a real-image-type finder optical system for obtaining an erecting image by means of the Porro prism.

22. The finder display apparatus as claimed in claim 20, wherein said twisted nematic liquid crystal is arranged in a vicinity of a display prism in a bright frame inverted Galilean finder optical system for use in a camera, said display prism having a polarization characteristic, transmitting a subject image and directing a display content to an eyepiece.

23. The finder display apparatus as claimed in claim 20, wherein said twisted nematic liquid crystal is arranged between a focusing screen and a pentagonal roof prism of a single-lens reflex camera, said twisted nematic liquid crystal including a first twisted nematic liquid crystal arranged for providing a display superimposed on a subject image and a second twisted nematic liquid crystal arranged for providing a display outside an image plane, said second twisted nematic liquid crystal being arranged in a vicinity of said first twisted nematic liquid crystal.

24. The finder display aparatus as claimed in claim 20, wherein said twisted nematic liquid crystal is arranged between a focusing screen and a pentagonal roof prism of a single-lens reflex camera, said twisted nematic liquid crystal being used for both providing a display superimposed on a subject image and providing a display outside an image plane.

25. The finder display apparatus as claimed in claim 20, wherein said one of the two polarizing members is a polarizing plate arranged on an exit surface of a pentagonal roof prism.

26. The finder display apparatus as claimed in claim 20, wherein said one of the two polarizing members is a polarizing plate arranged on a surface of a protecting plate provided on a pupil side of an eyepiece.

27. A finder display apparatus comprising:

a finder optional system of real image type including an element for erecting an image;

an electro-optical device arranged on an optical path of said finder optical system, said electro-optical device including: a display element for displaying photographic information so as to be viewed together with a subject image; and a pair of polarizing members arranged one on one side and the other on the other side of said display element for making the photographic information visible, wherein at least one of the pair of polarizing members constituting said electro-optical device is separated from said display element.

28. The finder display apparatus according to claim 27, wherein said finder is for use in a camera.

29. The finder display apparatus according to claim 27, wherein said display element is liquid crystal.

30. The finder display apparatus according to claim 29, wherein said liquid crystal is of twisted nematic type.

31. The finder display apparatus according to claim 27, wherein said element for erecting an image is a Porro prism.

32. The finder display apparatus according to claim 27, wherein said element for erecting an image is a pentagonal roof prism.

33. The finder display apparatus according to claim 27, wherein said element for erecting an image is a relay optical system.

34. The finder display apparatus according to claim 27, wherein said polarizing member separated from the display element is constituted by the element for erecting an image.

35. A finder display apparatus comprising:

a finder optical system of virtual image type;

an electro-optical device arranged on an optical path of said finder optical system, said electro-optical device including: a display element for displaying photographic information so as to be viewed together with a subject image; and a pair of polarizing members arranged one on one side and the other on the other side of said display element for making the photographic information visible, wherein at least on of the pair of polarizing members constituting said electro-optical device is separated from said display element.

36. The finder display apparatus according to claim 35, wherein said finder is for use in a camera.

37. The finder display apparatus according to claim 35, wherein said display element is liquid crystal.

38. The finder display apparatus according to claim 37, wherein said liquid crystal is of twisted nematic type.

39. The finder display apparatus according to claim 35, wherein said optical system is of inverted Galilean type.

40. The finder display apparatus according to claim 39, further comprising a bright frame.

\* \* \* \* \*